(12) United States Patent
Kazama

(10) Patent No.: US 8,307,160 B2
(45) Date of Patent: Nov. 6, 2012

(54) INTERFACE APPARATUS, CALCULATION PROCESSING APPARATUS, INTERFACE GENERATION APPARATUS, AND CIRCUIT GENERATION APPARATUS

(75) Inventor: Hideki Kazama, Kanagawa (JP)

(73) Assignee: Sony Corporation, Tokyo (JP)

( * ) Notice: Subject to any disclaimer, the term of this patent is extended or adjusted under 35 U.S.C. 154(b) by 269 days.

(21) Appl. No.: 12/694,556

(22) Filed: Jan. 27, 2010

(65) Prior Publication Data
US 2010/0199044 A1 Aug. 5, 2010

(30) Foreign Application Priority Data
Jan. 30, 2009 (JP) .................................. 2009-019893

(51) Int. Cl.
*G06F 12/00* (2006.01)
(52) U.S. Cl. ......... 711/130; 711/118; 709/213; 716/104
(58) Field of Classification Search ........................ None
See application file for complete search history.

(56) References Cited

U.S. PATENT DOCUMENTS

| | | | | |
|---|---|---|---|---|
| 6,704,914 | B2 * | 3/2004 | Nishida et al. | 716/103 |
| 7,945,879 | B2 * | 5/2011 | Zeidman et al. | 716/104 |
| 2002/0184445 | A1 * | 12/2002 | Cherabuddi | 711/130 |
| 2005/0193293 | A1 * | 9/2005 | Shikata | 714/718 |
| 2006/0190678 | A1 * | 8/2006 | Butler et al. | 711/106 |
| 2008/0109613 | A1 * | 5/2008 | Jarosh et al. | 711/154 |
| 2008/0126603 | A1 * | 5/2008 | Hosoya | 710/22 |

FOREIGN PATENT DOCUMENTS

| | | |
|---|---|---|
| JP | 01-111245 | 4/1989 |
| JP | 08-016467 | 1/1996 |
| JP | 2002-182979 | 6/2002 |
| JP | 3644380 | 2/2005 |

\* cited by examiner

*Primary Examiner* — Yaima Campos
*Assistant Examiner* — Daniel Tsui
(74) *Attorney, Agent, or Firm* — Wolf, Greenfield & Sacks, P.C.

(57) ABSTRACT

There is provided is an interface apparatus including: a stream converter receiving write-addresses and write-data, storing the received data in a buffer, and sorting the stored write-data in the order of the write-addresses to output the write-data as stream-data; a cache memory storing received stream-data if a load-signal indicates that the stream-data are necessarily loaded and outputting data stored in a storage device corresponding to an input cache-address as cache-data; a controller determining whether or not data allocated with a read-address have already been loaded, outputting the load-signal instructing the loading on the cache memory if not loaded, and outputting a load-address indicating a load-completed-address of the cache memory; and at least one address converter calculating which one of the storage devices the allocated data are stored in, by using the load-address, outputting the calculated value as the cache-address to the cache memory, and outputting the cache-data as read-data.

11 Claims, 39 Drawing Sheets

FIG. 11

<1> BUFFER CAPACITY OF STREAM CONVERSION
<2> TYPE OF STORAGE DEVICES USED FOR BUFFER OF STREAM CONVERSION
<3> CACHE MEMORY CAPACITY
<4> TYPE OF STORAGE DEVICES USED FOR CACHE MEMORY
<5> NUMBER OF INPUT OF READ ADDRESS
<6> PATTERN OF CHANGE OF PRE-LOAD ADDRESS
<7> RELATIONSHIP BETWEEN READ ADDRESSES

FIG. 21

PRE-LOAD ADDRESS (PLADR) ≥ READ ADDRESS (RADR1)
PRE-LOAD ADDRESS (PLADR) ≥ READ ADDRESS (RADR2)
PRE-LOAD ADDRESS (PLADR) − READ ADDRESS (RADR1) + 1 ≤ CACHE MEMORY CAPACITY (CMC)
PRE-LOAD ADDRESS (PLADR) − READ ADDRESS (RADR2) + 1 ≤ CACHE MEMORY CAPACITY (CMC)

FIG. 22

```
for (x=0 ; x<WIDTH ; x++) {
       :
  write_address.put( x );
  write_data.put( ··· );
       :
}
```

FIG. 23

```
for (x=0 ; x<WIDTH ; x++) {
       :
  pre_load_address.put( x );
  wait( pre_load_done );
  read_address_a.put( x );
  if( x==0 ) {
    read_address_b.put( x );
  } else {
    read_address_b.put( x-1 );
  }
  ··· = read_data_a.get() + read_data_b.get();
       :
}
```

FIG. 25

| PRE-LOAD ADDRESS PLADR pre_load_address | READ ADDRESS a RADR1 read_address_a | READ ADDRESS b RADR2 read_address_b | LOADING NUMBER LDN | CACHE ADDRESS a CADR1 | CACHE ADDRESS b CADR2 |
|---|---|---|---|---|---|
| 0 | 0 | 0 | 1 | 0 | 0 |
| 1 | 1 | 0 | 1 | 0 | 1 |
| 2 | 2 | 1 | 1 | 0 | 1 |
| 3 | 3 | 2 | 1 | 0 | 1 |
| ⋮ | ⋮ | ⋮ | | | |
| WIDTH−2 | WIDTH−2 | WIDTH−3 | 1 | 0 | 1 |
| WIDTH−1 | WIDTH−1 | WIDTH−2 | 1 | 0 | 1 |

FIG. 30

|   | x | x | x | x-1 |
|---|---|---|---|---|
| x |   | 0 | 0 | 1 |
| x | 0 |   | 0 | 1 |
| x | 0 | 0 |   | 1 |
| x-1 | 1 | 1 | 1 |   |

FIG. 33

| TIME POINT t | WRITE ADDRESS WADR | WRITE VALID SIGNAL VWRT | list | NUMBER OF ADDRESSES REGISTERED TO list | next | ALARM |
|---|---|---|---|---|---|---|
| 0 | 0 | 0 | NULL | 0 | 0 | NO |
| 1 | 0 | 1 | NULL | 0 | 1 | NO |
| 2 | 4 | 1 | {4} | 1 | 1 | NO |
| 3 | 2 | 1 | {4, 2} | 2 | 1 | NO |
| 4 | 1 | 1 | {4} | 2 | 3 | NO |
| 5 | 5 | 1 | {4, 5} | 2 | 3 | NO |
| 6 | 6 | 1 | {4, 5, 6} | 3 | 3 | DISPLAY ALARM |

FIG. 35

| TIME POINT | READ ADDRESS | READ VALID SIGNAL | max | max − READ ADDRESS + 1 | ALARM |
|---|---|---|---|---|---|
| 0 | 0 | 0 | −1 | − | NO |
| 1 | 1 | 1 | 1 | 1 | NO |
| 2 | 0 | 1 | 1 | 2 | NO |
| 3 | 3 | 1 | 3 | 1 | NO |
| 4 | 2 | 1 | 3 | 2 | NO |
| 5 | 1 | 1 | 3 | 3 | DISPLAY ALARM |

FIG. 37

```
for(x=0 ; x<WIDTH ; x++) {
        :
   array[x] = dout;
        :
} for(x=0 ; x<WIDTH ; x++) {
        :
   // pre_load_address = x
   d1 = array[ x ];
   if( x==0 ) {
      d2 = array[ x ];
   } else {
      d2 = array[ x-1 ];
   }
   ... = d1 + d2;
        :
}
```

FIG. 38

```
for(x=0 ; x<WIDTH ; x++) {
          :
   write_address.put( x );
   write_data.put( dout );
          :
} for(x=0 ; x<WIDTH ; x++) {
          :
   pre_load_addres.put( x );
   read_address_a.put( x );
   d1 = read_data_a.get();
   if( x==0 ) {
      read_address_b.put( x );
      d2 = read_data_b.get();
   } else {
      read_address_c.put( x-1 );
      d2 = read_data_c.get();
   }
   ... = d1 + d2;
          :
}
```

FIG. 39

```
for(y=0 ; y<HEIGHT ; y++) {
  for(x=0 ; x<WIDTH ; x++) {
      :
    array[y][x] = dout;
      :
  }
} for(y=0 ; y<HEIGHT ; y++) {
  for(x=0 ; x<WIDTH ; x++) {
      :
    // pre_load_address = y, x
    d1 = array[y][x];
    if( x==0 ) {
      d2 = array[y][x];
    } else {
      d2 = array[y][x-1];
    }
    ... = d1 + d2;
      :
  }
}
```

FIG. 40

```
for(y=0 ; y<HEIGHT ; y++) {
  for(x=0 ; x<WIDTH ; x++) {
      :
    write_address.put( y*WIDTH+x );
    write_data.put( dout );
      :
  }
}
for(y=0 ; y<HEIGHT ; y++) {
  for(x=0 ; x<WIDTH ; x++) {
      :
    pre_load_addres.put( y*WIDTH+x );
    read_address_a.put( y*WIDTH+x );
    d1 = read_data_a.get();
    if( x==0 ) {
      read_address_b.put( y*WIDTH+x );
      d2 = read_data_b.get();
    } else {
      read_address_c.put( y*WIDTH+(x-1) );
      d2 = read_data_c.get();
    }
    ... = d1 + d2;
      :
  }
}
```

INTERFACE APPARATUS, CALCULATION PROCESSING APPARATUS, INTERFACE GENERATION APPARATUS, AND CIRCUIT GENERATION APPARATUS

BACKGROUND OF THE INVENTION

1. Field of the Invention

The present invention relates to an interface apparatus, which is adapted as an interface between calculation units that perform data transmission by using address allocation, a calculation processing apparatus, an interface generation apparatus, and circuit generation apparatus.

2. Description of the Related Art

In general, in order to perform data transmission by address allocation, a large-capacity storage device is disposed between calculation units (for example, refer to Japanese Patent No. 3644380).

FIG. 1 is a block diagram illustrating an example of a calculation processing apparatus employing a general data transmission method.

The calculation processing apparatus 10 shown in FIG. 1 includes a first calculation unit 11, a second calculation unit 12, a main storage unit 13, and an address selector 14.

In addition, in FIG. 1, WDT, WADR, WCTL, RDT, RADR, and ADR denotes write data, a write address, a write control signal, read data, a read address, and a selected address, respectively.

In the calculation processing apparatus 10 shown in FIG. 1, the write data WDT output from the first calculation unit 11 are stored at a position allocated with the write address WADR in the main storage unit 13.

Next, in the calculation processing apparatus 10, the second calculation unit 12 reads data at a position allocated with the read address RADR from the storage device, so that the data transmission from the first calculation unit 11 to the second calculation unit 12 is performed.

In addition, in general, in the case where the transmission rate of the large-capacity main storage unit is low and too much time is taken for the data transmission, a cache memory is disposed between the calculation unit and the main storage unit (for example, refer to Japanese Unexamined Patent Application Publication No. 8-16467).

FIG. 2 is a block diagram illustrating an example of a calculation processing apparatus using a cache memory.

A calculation processing apparatus 10A shown in FIG. 2 is configured by disposing a cache memory 15 to the configuration of the calculation processing apparatus 10 shown in FIG. 1.

In the calculation processing apparatus 10A of FIG. 2, the write data WDT output from the first calculation unit 11 are temporarily written in the small-capacity, high-rate cache memory 15. Next, the second calculation unit 12 reads the data allocated with the read address RADR from the cache memory 15, so that the data transmission from the first calculation unit 11 to the second calculation unit 12 is performed.

The cache memory 15 periodically writes the write data WDT stored in the cache memory 15 in the main storage unit 13 in a collective manner.

In addition, in the case where the data allocated with the read address RADR do not exist in the cache memory 15, the cache memory 15 reads data from a storage device corresponding to the read address RADR in the main storage unit 13 and outputs the data as the read data RDT.

In the data transmission method shown in FIG. 1, since it is necessary that the main storage unit has the storage devices uniquely corresponding to the addresses indicated by the write address WADR and the read address RADR, large-capacity storage devices have to be provided, so that there is a disadvantage in that the area of circuits is increased.

For example, in the technology disclosed in Japanese Patent No. 3644380, as shown in FIG. 13 of Japanese Patent No. 3644380, when two processors communicate with each other, it is necessary that a main memory connected to a memory controller is used. Therefore, there is a disadvantage in that the large-capacity storage devices have to be provided.

In the data transmission method shown in FIG. 2, the number of times of accessing a low-rate main storage unit 13 is reduced, so that high-rate data transmission may be effectively implemented.

However, since it is necessary that the main storage unit 13 has storage devices uniquely corresponding to the addresses ADR indicated by the write address WADR and the read address RADR, large-capacity storage devices have to be provided, so that the disadvantageous problem in that the area of circuits is increased is not solved.

For example, in the technology disclosed in Japanese Unexamined Patent Application Publication No. 8-16467, as shown in FIG. 1 of Japanese Unexamined Patent Application Publication No. 8-16467, in the related art, the cache memory temporarily stores the data read from the main memory or temporarily stores the data that are to be written in the main memory.

Therefore, in the configuration of the technology, the data transmission may not be performed without the main memory. Since it is necessary that the storage devices uniquely corresponding to the addresses are provided, there is a disadvantage in that the large-capacity storage devices must be provided to the main memory.

As described above, in the configuration shown in FIGS. 1 and 2, if there is no large-capacity storage device uniquely corresponding to the addresses output from the calculation unit, there is a problem in that the data transmission may not be performed.

Therefore, there is contrived a configuration where the main storage unit is removed from the configuration of FIG. 2, and as shown in FIG. 3, the first calculation unit 11 and the second calculation unit 12 communicate with each other by using only the cache memory 15.

According to the configuration, a capacity of a storage device that is necessary for the interface apparatus may be reduced.

However, in the configuration shown in FIG. 3, although there are data that are not read by the second calculation unit 12, the first calculation unit 11 updates the contents of the cache memory 15, and thus, there is a problem in that the data necessary for the second calculation unit 12 may be overwritten. In this case, the data transmission may not be properly performed.

In addition, in the configuration shown in FIG. 3, there is a problem in that it is necessary to increase the number of data stored in the cache memory 15 so as to reduce concerns that the data transmission will be incorrectly performed.

SUMMARY OF THE INVENTION

It is desirable to provide an interface apparatus capable of connecting calculation units by using the minimum number of storage devices, thereby surely performing data transmission by using address allocation even in the case where the number of data stored in a cache memory is set to a minimum, a calculation processing apparatus, an interface generation apparatus, and a circuit generation apparatus therefore.

According to a first embodiment of the present invention, there is provided an interface apparatus including: a stream converter that receives write addresses and write data, stores the received data in a buffer, and sorts the write data stored in the buffer in the order of the write addresses to output the write data as stream data; a cache memory that stores received stream data in a storage device if a load signal is in a state of indicating that it is necessary that the stream data are loaded and that outputs data stored in the storage device corresponding to a cache address as cache data if the cache address is input; a controller that determines whether or not data allocated with address information on reading have already been loaded on the cache memory, that outputs the load signal instructing the loading on the cache memory if the allocated data are not loaded on the cache memory as a result of the determination, and that outputs a load address indicating a load-completed address of the cache memory; and at least one address converter that calculates a value representing which one of the storage devices of the cache memory the data allocated with the read address are stored in, by using the load address indicating the load-completed address of the cache memory, that outputs the calculated value as the cache address to the cache memory, and that outputs the cache data input from the cache memory as read data.

According to a second embodiment of the present invention, there is provided a calculation processing apparatus including: a first calculation unit; a second calculation unit; and an interface apparatus that performs data transmission by using address allocation between the first calculation unit and the second calculation unit, wherein the interface apparatus includes: a stream converter that receives write addresses and write data from the first calculation unit, stores the received data in a buffer, and sorts the write data stored in the buffer in the order of the write addresses to output the write data as stream data; a cache memory that stores received stream data in a storage device if a load signal is in a state of indicating that it is necessary that the stream data are loaded and that outputs data stored in the storage device corresponding to a cache address as cache data if the cache address is input; a controller that determines whether or not data allocated with address information on reading have already been loaded on the cache memory by the second calculation unit, that outputs the load signal instructing the loading on the cache memory if the allocated data are not loaded on the cache memory as a result of the determination, and that outputs a load address indicating a load-completed address of the cache memory; and at least one address converter that calculates a value representing which one of the storage devices of the cache memory the data allocated with the read address are stored in, by using the load address indicating the load-completed address of the cache memory, that outputs the calculated value as the cache address to the cache memory, and that outputs to the second calculation unit the cache data input from the cache memory as read data.

According to a third embodiment of the present invention, there is provided an interface generation apparatus for generating an interface apparatus, wherein the interface apparatus includes: a stream converter that receives write addresses and write data, stores the received data in a buffer, and sorts the write data stored in the buffer in the order of the write addresses to output the write data as stream data; a cache memory that stores received stream data in a storage device if a load signal is in a state of indicating that it is necessary that the stream data are loaded and that outputs data stored in the storage device corresponding to a cache address as cache data if the cache address is input; a controller that determines whether or not data allocated with address information on reading have already been loaded on the cache memory, that outputs the load signal instructing the loading on the cache memory if the allocated data are not loaded on the cache memory as a result of the determination, and that outputs a load address indicating a load-completed address of the cache memory; and at least one address converter that calculates a value representing which one of the storage devices of the cache memory the data allocated with the read address are stored in, by using the load address indicating the load-completed address of the cache memory, that outputs the calculated value as the cache address to the cache memory, and that outputs the cache data input from the cache memory as read data, and wherein the interface generation apparatus includes: a circuit information storage unit that stores circuit description information of a circuit connected to an interface that is an object of generation; and an interface configuration information output unit that analyzes specifications, which are to be satisfied by the interface, based on the circuit description information read from the circuit information storage unit.

According to a fourth embodiment of the present invention, there is provided a circuit generation apparatus for generating a calculation unit connected to an interface apparatus, wherein the interface apparatus includes: a stream converter that receives write addresses and write data, stores the received data in a buffer, and sorts the write data stored in the buffer in the order of the write addresses to output the write data as stream data; a cache memory that stores received stream data in a storage device if a load signal is in a state of indicating that it is necessary that the stream data are loaded and that outputs data stored in the storage device corresponding to a cache address as cache data if the cache address is input; a controller that determines whether or not data allocated with address information on reading have already been loaded on the cache memory, that outputs the load signal instructing the loading on the cache memory if the allocated data are not loaded on the cache memory as a result of the determination, and that outputs a load address indicating a load-completed address of the cache memory; and at least one address converter that calculates a value representing which one of the storage devices of the cache memory the data allocated with the read address are stored in, by using the load address indicating the load-completed address of the cache memory, that outputs the calculated value as the cache address to the cache memory, and that outputs the cache data input from the cache memory as read data, and wherein the circuit generation apparatus includes: a circuit description storage unit that stores description expressing functions of the calculation unit connected to the interface apparatus; an array access replacement unit that extracts reading and writing with respect to an array, which is to be an object of generation of the interface apparatus, from the circuit description read from the circuit description storage unit and performs replacement with description expressing a communication protocol for connection to the interface apparatus; and a detailed circuit generation apparatus that generates detailed circuit description from description that is subject to replacement of array access.

According to the invention, since the calculation units may be connected to each other by using the minimum number of storage devices, even in the case where the number of data stored in the cache memory is set to a minimum, the data transmission using address allocation may be surely performed.

BRIEF DESCRIPTION OF THE DRAWINGS

FIG. 11 is a diagram illustrating an example of specifications that is to be satisfied by an interface that is analyzed by the interface generation apparatus of FIG. 10.

FIG. 21 is a diagram illustrating a relationship between the pre-load address and read address that are generated by a second calculation unit of FIG. 16 and a capacity of a cache memory.

FIG. 22 is a diagram illustrating an example of expression of specifications of a first calculation unit.

FIG. 23 is a diagram illustrating an example of expression of specifications of a second calculation unit.

FIG. 25 is a diagram illustrating an example of a pre-load address, a read address, and another read address that are output from the second calculation unit having the specifications shown in FIG. 23.

FIG. 30 is a diagram illustrating an example of difference in a calculation equation for addresses extracted from circuit description shown in FIG. 29.

FIG. 33 is a diagram illustrating a detailed table listing exemplary operations of a write address consistency verification unit in the verification interface apparatus shown in FIG. 32.

FIG. 35 is a diagram illustrating a detailed table listing exemplary operations of a read address consistency verification unit in the verification interface apparatus shown in FIG. 34.

FIG. 37 is a diagram illustrating an example of circuit description stored in a circuit description storage unit.

FIG. 38 is a diagram illustrating an example where array access is replaced with description of performing connection to an interface apparatus.

FIG. 39 is a diagram illustrating another example of circuit description stored in a circuit description storage unit.

FIG. 40 is a diagram illustrating another example where array access is replaced with description of performing connection to an interface apparatus.

DESCRIPTION OF THE PREFERRED EMBODIMENTS

Hereinafter, exemplary embodiments of the invention are described with reference to the attached drawings.

In addition, the description is made in the following order.

1. First Embodiment (First Example of Configuration of Interface Apparatus)
2. Second Embodiment (Second Example of Configuration of Interface Apparatus)
3. Third Embodiment (Third Example of Configuration of Interface Apparatus)
4. Fourth Embodiment (Fourth Example of Configuration of Interface Apparatus)
5. Fifth Embodiment (Fifth Example of Configuration of Interface Apparatus)
6. Sixth Embodiment (Sixth Example of Configuration of Interface Apparatus)
7. Seventh Embodiment (Seventh Example of Configuration of Interface Apparatus)
8. Eighth Embodiment (Eighth Example of Configuration of Interface Apparatus)
9. Ninth Embodiment (Ninth Example of Configuration of Interface Apparatus)
10. Detailed Examples of Configuration 1. First Embodiment FIG. 4 is a block diagram illustrating an example of a configuration of a calculation processing apparatus employing an interface apparatus according to a first embodiment of the invention.

Figure 4:
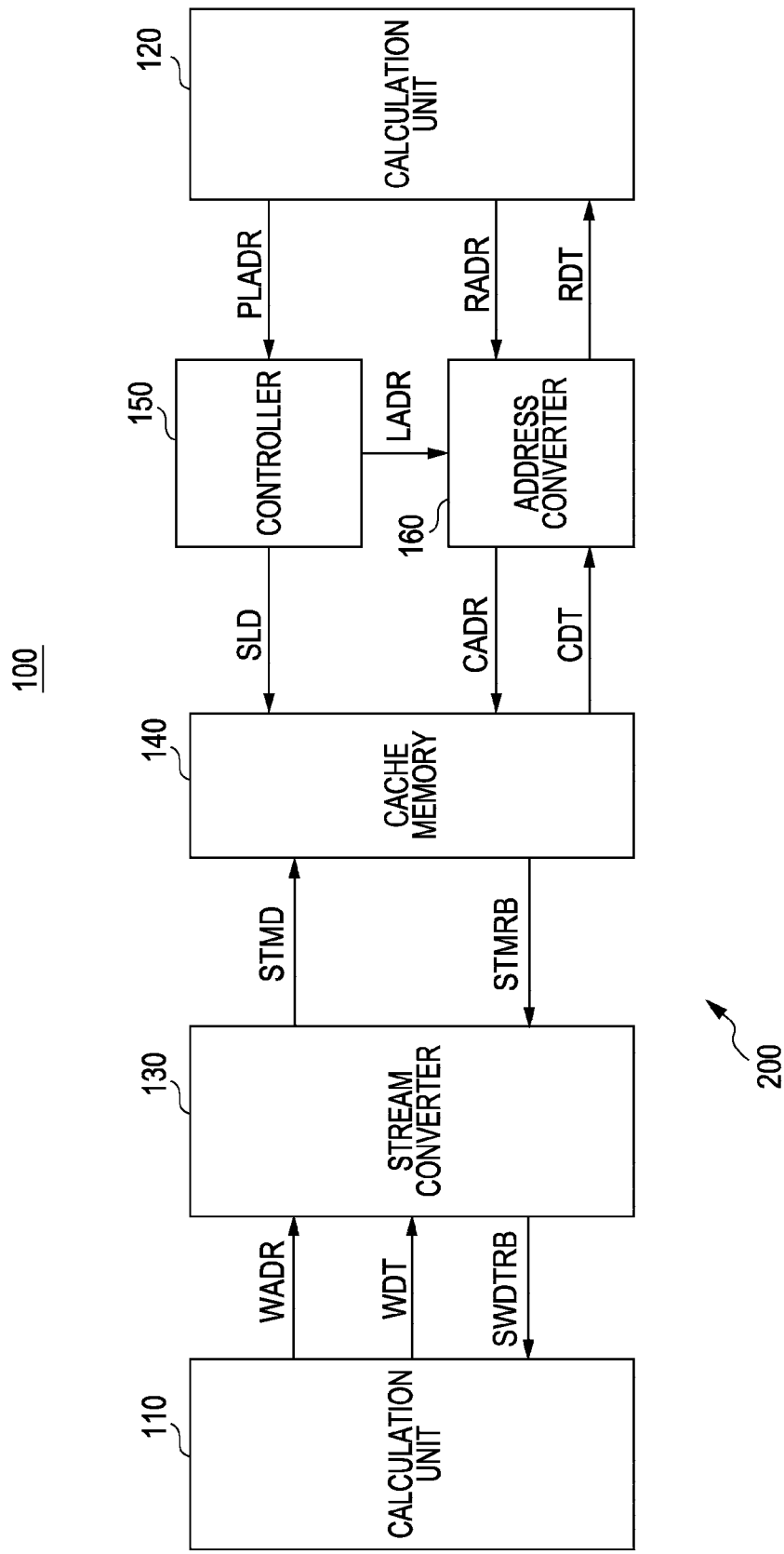
FIG. 4 is a block diagram illustrating an example of a configuration of a calculation processing apparatus employing an interface apparatus according to a first embodiment of the invention.

As shown in FIG. 4, the calculation processing apparatus 100 according to the first embodiment includes a first calculation unit 110, a second calculation unit 120, a stream converter 130, a cache memory 140, a controller 150A, and an address converter 160.

In addition, the stream converter 130, the cache memory 140, the controller 150A, and the address converter 160 constitutes an interface apparatus 200.

Examples of configurations of the stream converter 130, the cache memory 140, the controller 150A, and the address converter 160 are described later in detail.

In FIG. 4, WADR, WDT, SWDTRB, STMD, and STMRB denote a write address, write data, a write data receivable signal, stream data, and a stream receivable signal, respectively.

In addition, in FIG. 4, PLADR, RADR, RDT, SLD, LADR, CADR, and CDT denote a pre-load address, a read address, read data, a load signal, a load address, a cache address, and cache data, respectively.

In addition, address information associated with reading includes a pre-load address PLADR and a read address RADR.

The first calculation unit 110 outputs the write addresses WADR, of which order is regular, and the write data WDT to the stream converter 130.

For example, in the case where the write data receivable signal SWDTRB from the stream converter 130 indicates receivable, the first calculation unit 110 outputs the write data WDT to the stream converter 130.

For example, in the case where the write data receivable signal SWDTRB from the stream converter 130 indicates non-receivable, the first calculation unit 110 stops outputting the write data WDT to the stream converter 130.

The second calculation unit 120 outputs the pre-load address PLADR to the controller 150A.

The second calculation unit 120 outputs the read address RADR to the address converter 160 and receives the read data RDT from the address converter 160.

The stream converter 130 receives the write address WADR and the write data WDT from the first calculation unit 110 and stores the received data in an internal buffer.

The stream converter 130 arranges the write data WDT stored in the internal buffer in the order of the write addresses WADR and outputs the arranged write data as the stream data STMD to the cache memory 140.

The stream converter 130 outputs the stream data STMD only during the time that the stream receivable signal STMRB from the cache memory 140 is in the receivable state.

If the internal buffer is not full and the write data are receivable, the stream converter 130 outputs the write data receivable signal SWDTRB in the receivable state to the first calculation unit 110.

In addition, if the internal buffer is full and the write data are non-receivable, the stream converter 130 changes the write data receivable signal SWDTRB into a non-receivable state.

If the load signal SLD from the controller 150A is in the state indicating that it is necessary to load the stream data STMD, the cache memory 140 changes the stream receivable signal STMRB into a receivable state.

If the stream receivable signal STMRB is changed into the receivable state, the cache memory 140 stores in the internal storage device the stream data STMD received from the stream converter 130.

In the case where the internal storage device finishes storing all the stream data STMD, the cache memory 140 erases the data in the order from the oldest data stored in the internal storage device.

If the cache address CADR is input from the address converter 160, the cache memory 140 outputs the data stored in the storage device corresponding to the cache address CADR as cache data CDT to the address converter 160.

The controller 150A determines whether or not the data allocated with the pre-load address PLADR input from the second calculation unit 120 are already loaded on the cache memory 140.

As a result, if the allocated data are not loaded on the cache memory 140, the controller 150A outputs a load signal SLD instructing loading to the cache memory 140.

In addition, the controller 150A outputs to the address converter 160 a load address signal LADR indicating a load-completed address of the cache memory 140.

The address converter 160 calculates a value representing which one of the storage devices of the cache memory 140 the data allocated with the read address RADR are stored in, by using the load address LADR indicating a load-completed address of the cache memory 140.

The address converter 160 outputs the calculated value as a cache address CADR to the cache memory 140.

In addition, the address converter 160 outputs the input cache data CDT as read data RDT to the second calculation unit 120.

It should be noted that, in the interface apparatus 200 according to the first embodiment, the write address WADR and the read address RADR are configured in a regular order in various calculation such as an imaging process.

In the interface apparatus 200, the write data WDT from the first calculation unit 110 are sorted in the order of the write addresses by the stream converter 130 to be converted into the stream data STMD.

In the interface apparatus 200, the controller 150A determines based on the read address RADR from the second calculation unit 120 whether or not the cache memory 140 is to receive the stream data STMD.

In the first embodiment, due to the above configuration, even in the case where the number of data stored in the cache memory 140 is set to a minimum, the interface apparatus 200 capable of surely performing data transmission may be implemented.

Figure 1:
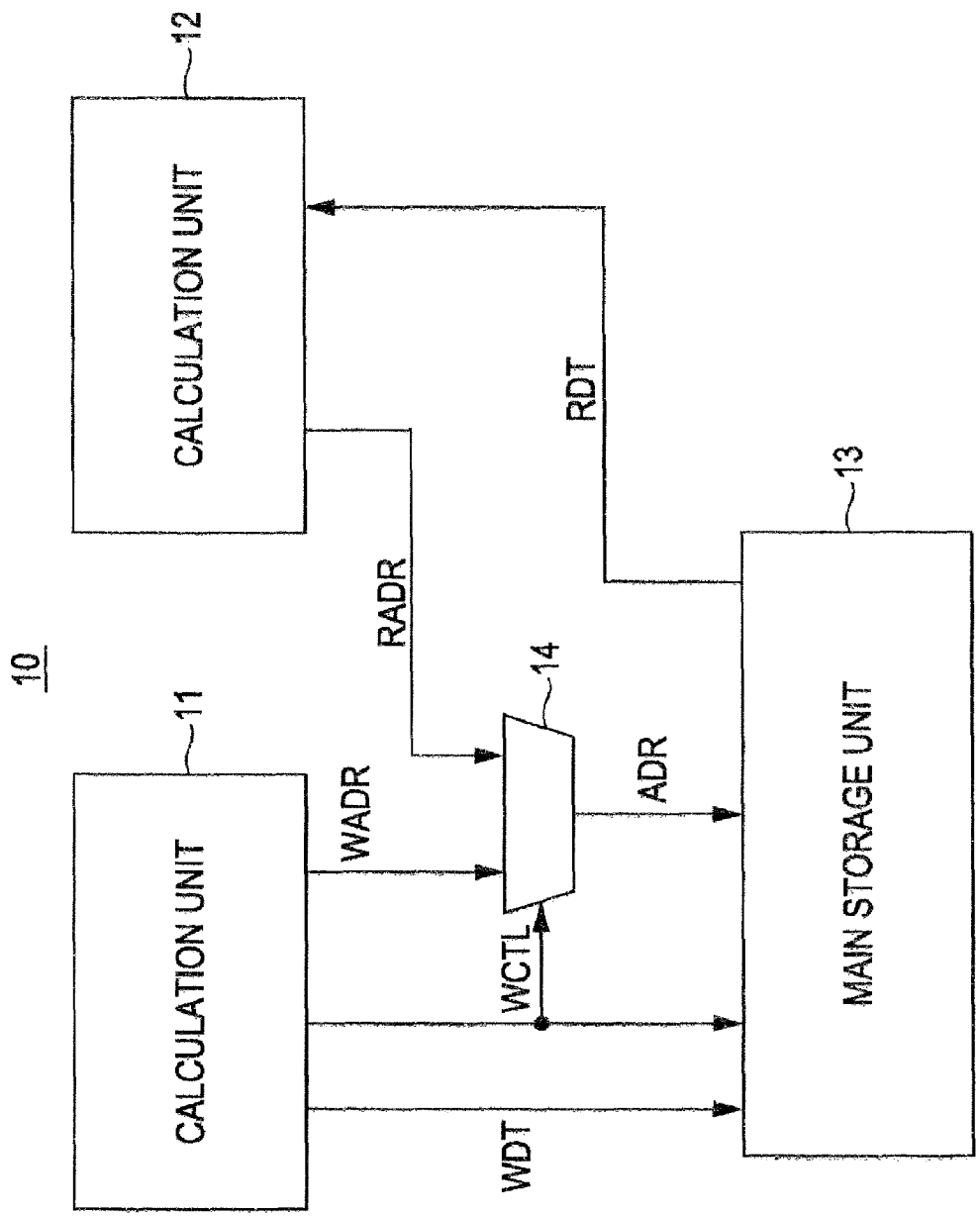
FIG. 1 is a block diagram illustrating an example of a calculation processing apparatus employing a general data transmission method.
Figure 2:
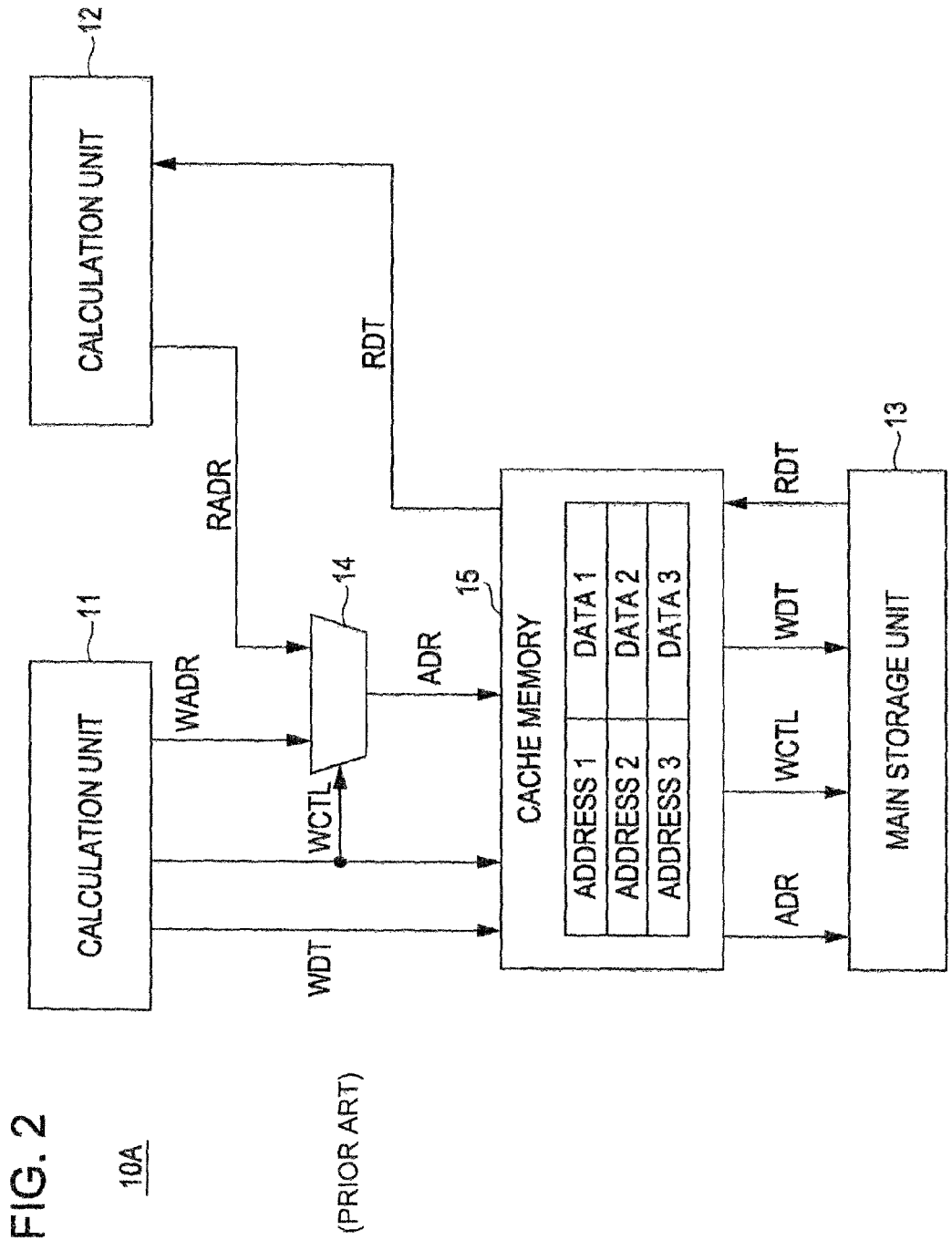
FIG. 2 is a block diagram illustrating an example of a calculation processing apparatus using a cache memory.
Figure 3:
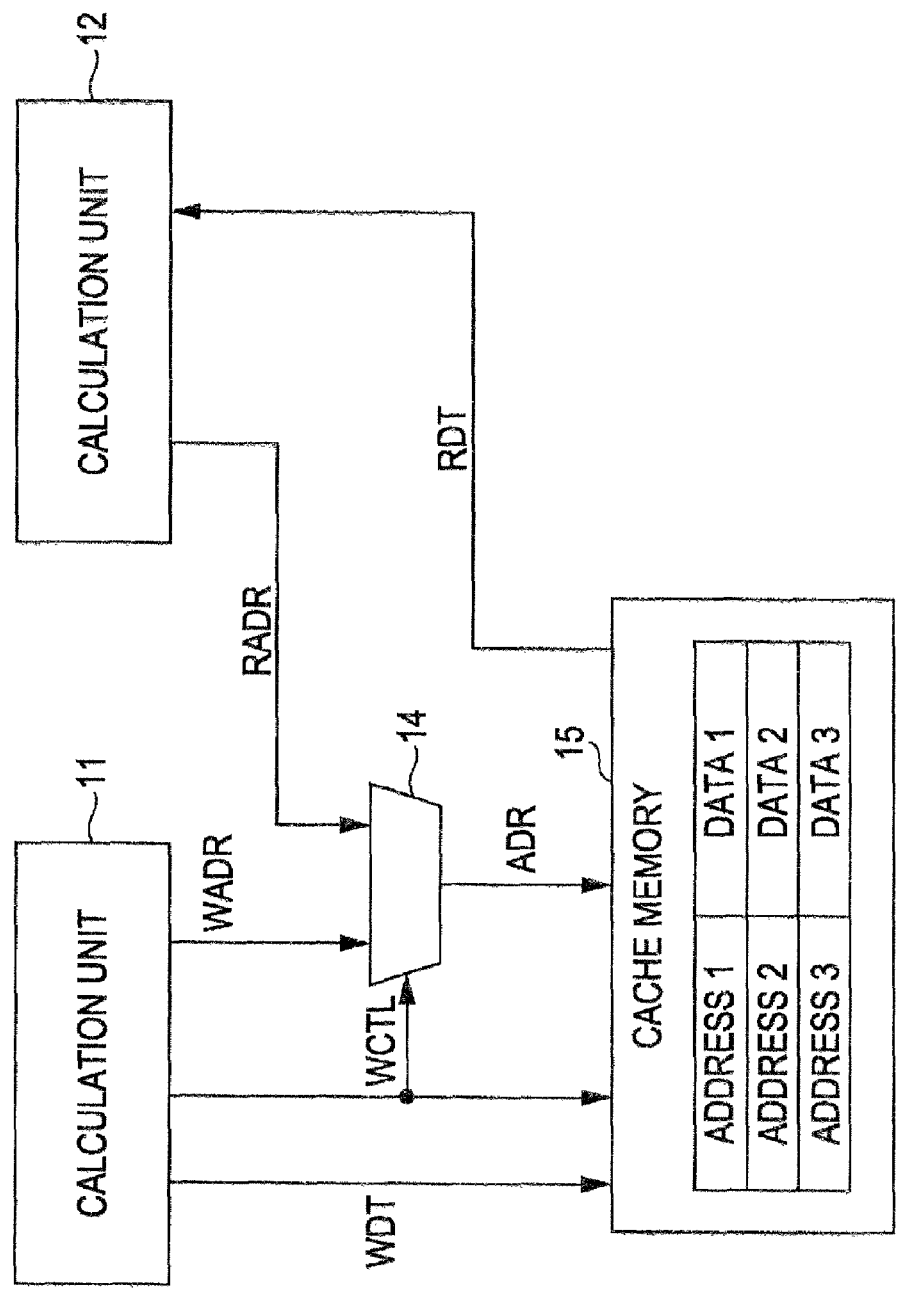
FIG. 3 is a block diagram illustrating another example of a calculation processing apparatus using a cache memory.

In addition, in the configurations shown in FIGS. 1 and 2, pairs of an address and data are necessarily stored in the cache memory.

However, in the interface apparatus 200 according to the first embodiment, since the stream converter 130 sorts the write data WDT in the order of the write addresses WADR, values of addresses are not necessarily stored in the cache memory 140.

Accordingly, in the first embodiment, the number of storage devices of the cache memory 140 may be reduced, and the configuration of the cache memory may be simplified.

2. Second Embodiment

Figure 5:
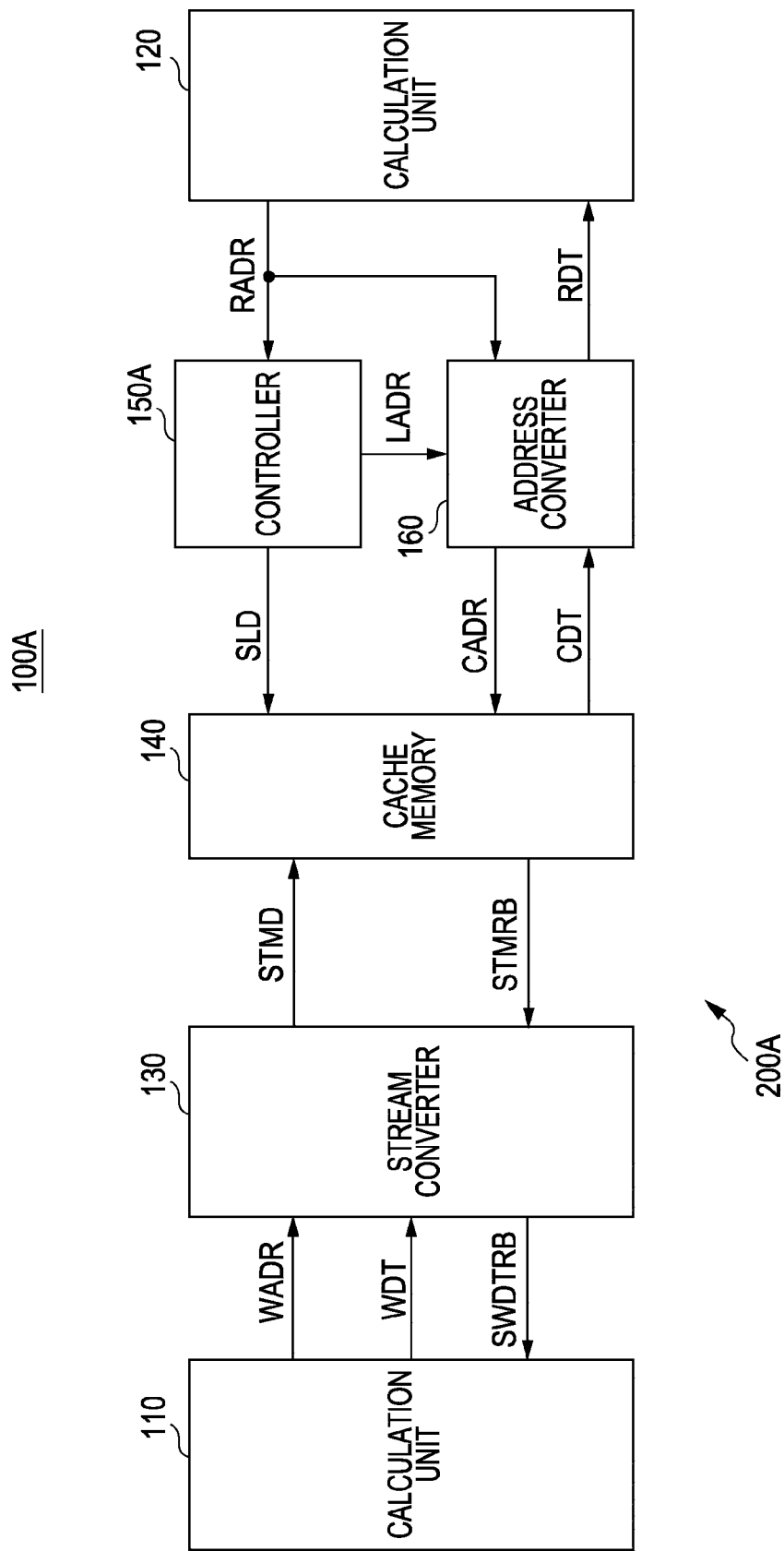
FIG. 5 is a block diagram illustrating an example of a configuration of a calculation processing apparatus employing an interface apparatus according to a second embodiment of the invention.

FIG. 5 is a block diagram illustrating an example of a configuration of a calculation processing apparatus employing an interface apparatus according to a second embodiment of the invention.

The interface apparatus 200A according to the second embodiment is different from the interface apparatus 200 according to the first embodiment in the following points.

The controller 150A of the interface apparatus 200A determines whether or not the data allocated with the read address RADR input from the second calculation unit 120 are already loaded on the cache memory 140.

If not loaded, the controller 150A outputs a load signal SLD instructing loading to the cache memory 140.

In addition, the controller 150A outputs to the address converter 160 a load address signal LADR indicating a load-completed address of the cache memory 140.

The other configurations are the same as those of the first embodiment.

According to the second embodiment, the same effects as the aforementioned effects of the first embodiment may be obtained.

3. Third Embodiment

Figure 6:
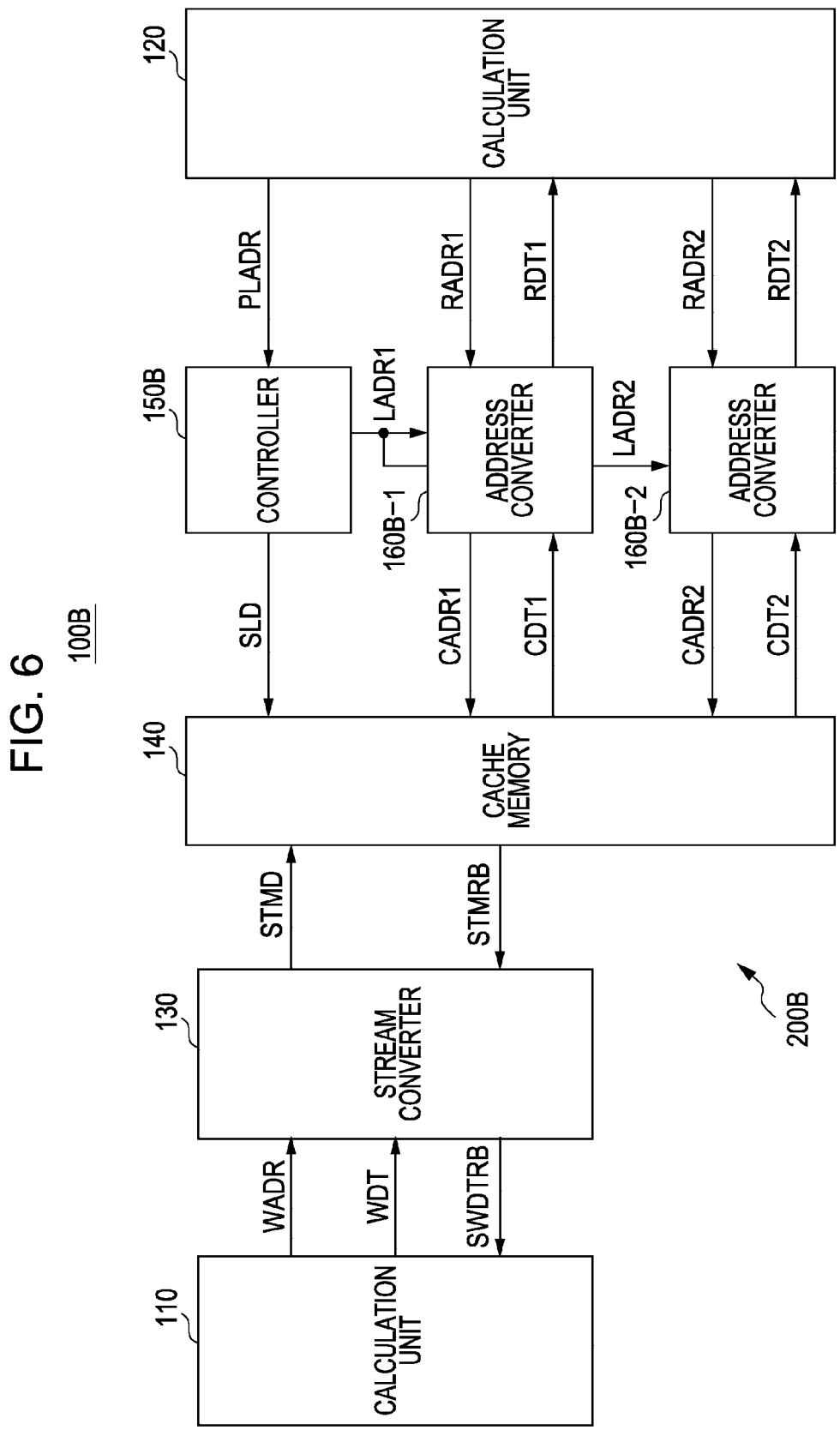
FIG. 6 is a block diagram illustrating an example of a configuration of a calculation processing apparatus employing an interface apparatus according to a third embodiment of the invention.

FIG. 6 is a block diagram illustrating an example of a configuration of a calculation processing apparatus employing an interface apparatus according to a third embodiment of the invention.

An interface apparatus 200B according to the third embodiment is different from the interface apparatus 200 according to the first embodiment in that a plurality of the address converters (two address converters in the embodiment) are disposed, so that the second calculation unit 120 may be configured to read a plurality of data.

The controller 150B determines whether or not the data allocated with the pre-load address PLADR input from the second calculation unit 120 are already loaded on the cache memory 140.

As a result, if the allocated data are not loaded on the cache memory 140, the controller 150B outputs a load signal SLD instructing loading to the cache memory 140.

The controller 150B outputs to the address converter 160B-1 a load address signal LADR1 indicating a load-completed address of the cache memory 140.

In addition, the controller 150B outputs to the address converter 160B-2 a load address signal LADR2 indicating a load-completed address of the cache memory 140.

The address converter 160B-1 calculates a value representing which one of the storage devices of the cache memory 140 the data allocated with the read address RADR1 are stored in, by using the load address LADR1 indicating a load-completed address of the cache memory 140.

The address converter 160B-1 outputs the calculated value as a cache address CADR1 to the cache memory 140.

In addition, the address converter 160B-1 outputs the input cache data CDT1 as read data RDT1 to the second calculation unit 120.

The address converter 160B-2 calculates a value representing which one of the storage devices of the cache memory 140 the data allocated with the read address RADR2 are stored in, by using the load address LADR2 indicating a load-completed address of the cache memory 140.

The address converter 160B-2 outputs the calculated value as a cache address CADR2 to the cache memory 140.

In addition, the address converter 160B-2 outputs the input cache data CDT2 as read data RDT2 to the second calculation unit 120.

The other configurations are the same as those of the first embodiment.

According to the third embodiment, the same effects as the aforementioned effects of the first embodiment may be obtained, and a plurality of data may be read.

In addition, although the number of address converters is two in the example shown in FIG. 6, the number may be larger than two.

4. Fourth Embodiment

Figure 7:
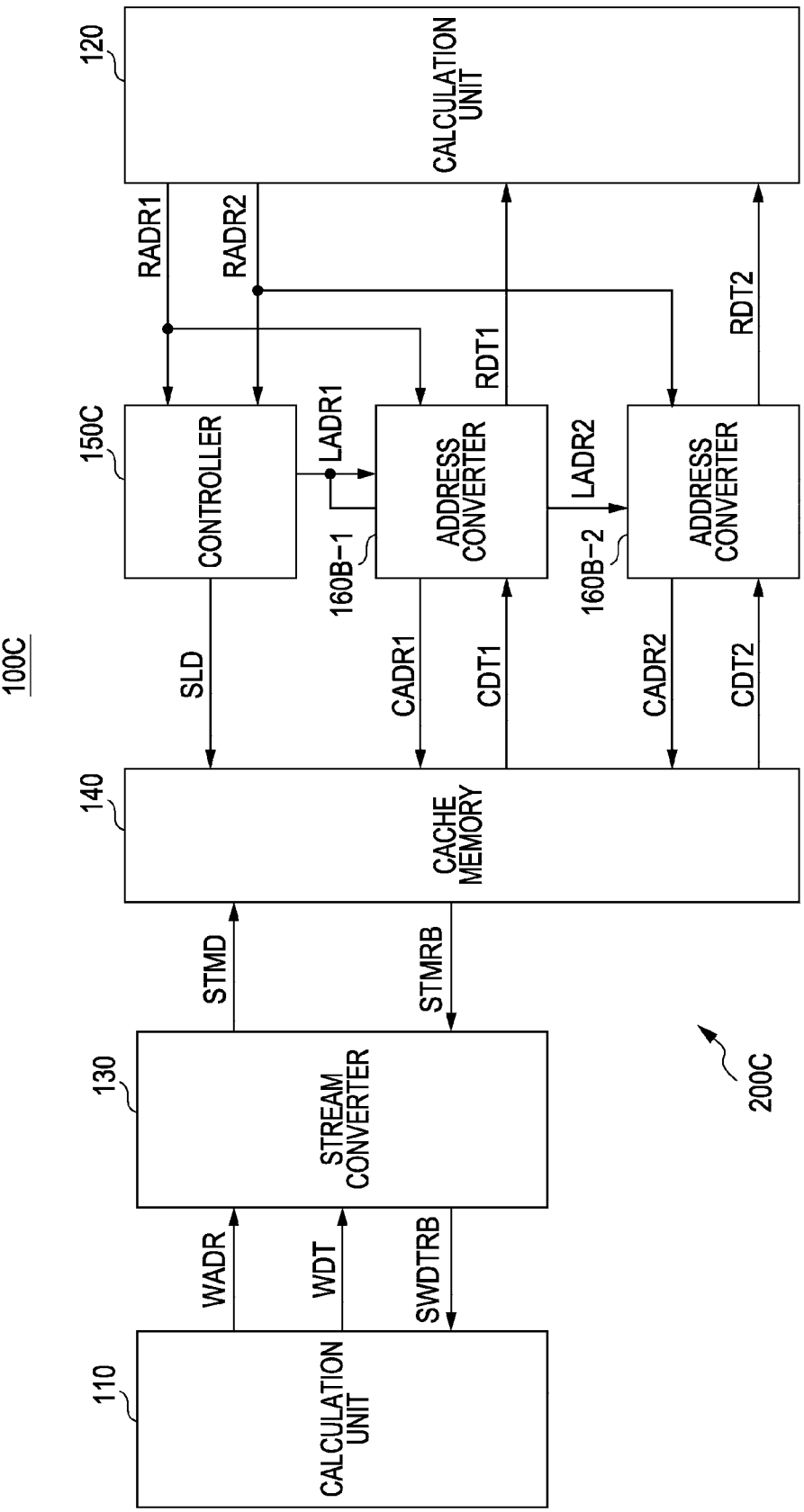
FIG. 7 is a block diagram illustrating an example of a configuration of a calculation processing apparatus employing an interface apparatus according to a fourth embodiment of the invention.

FIG. 7 is a block diagram illustrating an example of a configuration of a calculation processing apparatus employing an interface apparatus according to a fourth embodiment of the invention.

The interface apparatus 200C according to fourth embodiment is different from the interface apparatus 200B according to the third embodiment in the following points.

The controller 150C of the interface apparatus 200C determines whether or not the data allocated with the read address RADR1 input from the second calculation unit 120 are already loaded on the cache memory 140.

If not loaded, the controller 150C outputs a load signal SLD instructing loading to the cache memory 140.

In addition, the controller 150C outputs to the address converter 160B-1 a load address signal LADR1 indicating a load-completed address of the cache memory 140.

The controller 150C determines whether or not the data allocated with the read address RADR2 input from the second calculation unit 120 are already loaded on the cache memory 140.

If not loaded, the controller 150C outputs a load signal SLD instructing loading to the cache memory 140.

In addition, the controller 150C outputs to the address converter 160B-2 a load address signal LADR2 indicating a load-completed address of the cache memory 140.

The other configurations are the same as those of the third embodiment.

According to the fourth embodiment, the same effects as the aforementioned effects of the third embodiment may be obtained.

5. Fifth Embodiment

Figure 8:
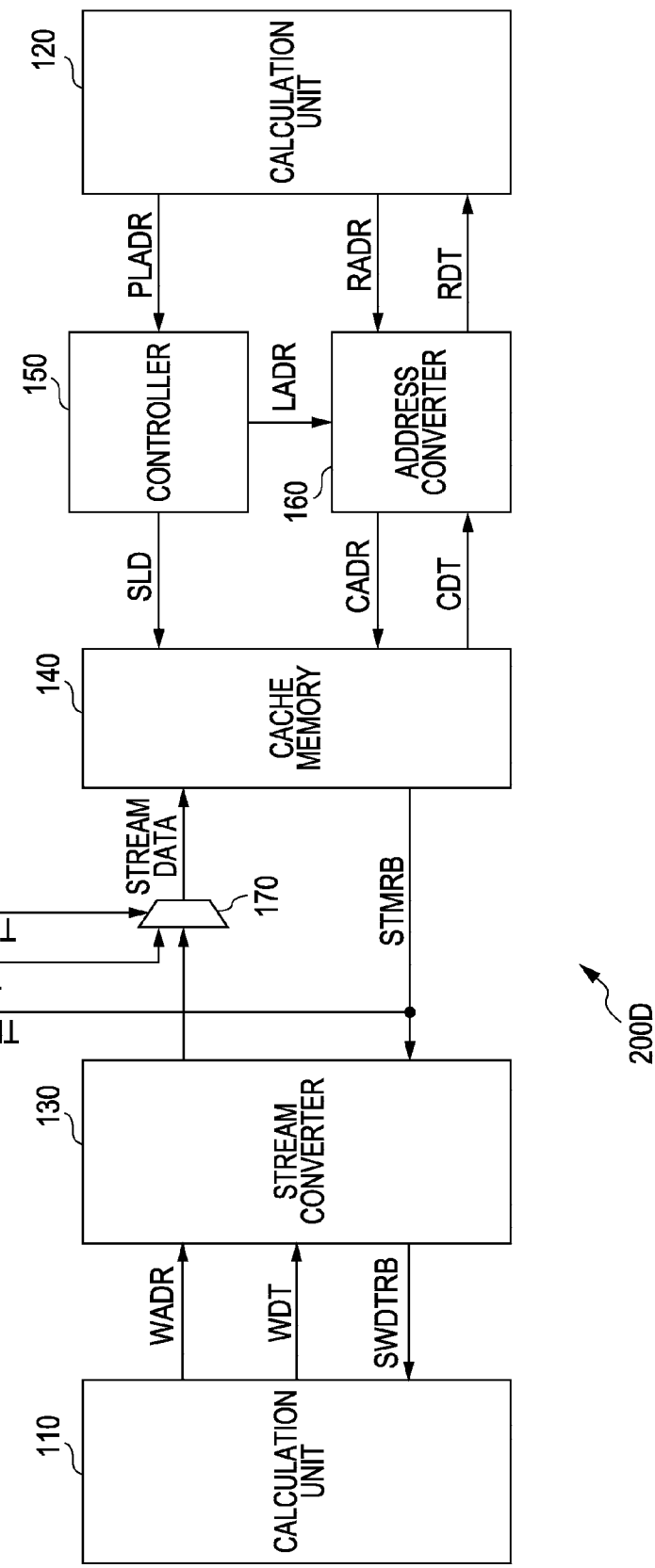
FIG. 8 is a block diagram illustrating an example of a configuration of a calculation processing apparatus employing an interface apparatus according to a fifth embodiment of the invention.

FIG. 8 is a block diagram illustrating an example of a configuration of a calculation processing apparatus employing an interface apparatus according to a fifth embodiment of the invention.

The interface apparatus 200D according to the fifth embodiment is different from the interface apparatus 200 according to the first embodiment in the following points.

The interface apparatus 200D includes a selector 170 which switches the data input from the first calculation unit 110 and test data TDT in response to a test mode switching signal TMSW so as to input the stream data STMD to the cache memory 140.

In addition, the interface apparatus 200D allows the cache memory 140 to supply the stream receivable signal STMRB as a test data receivable signal TDTRB to a test circuit (not shown).

The other configurations are the same as those of the first embodiment.

According to the fifth embodiment, the same effects as the aforementioned effects of the first embodiment may be obtained, and the test using the test data may be performed.

6. Sixth Embodiment

Figure 9:
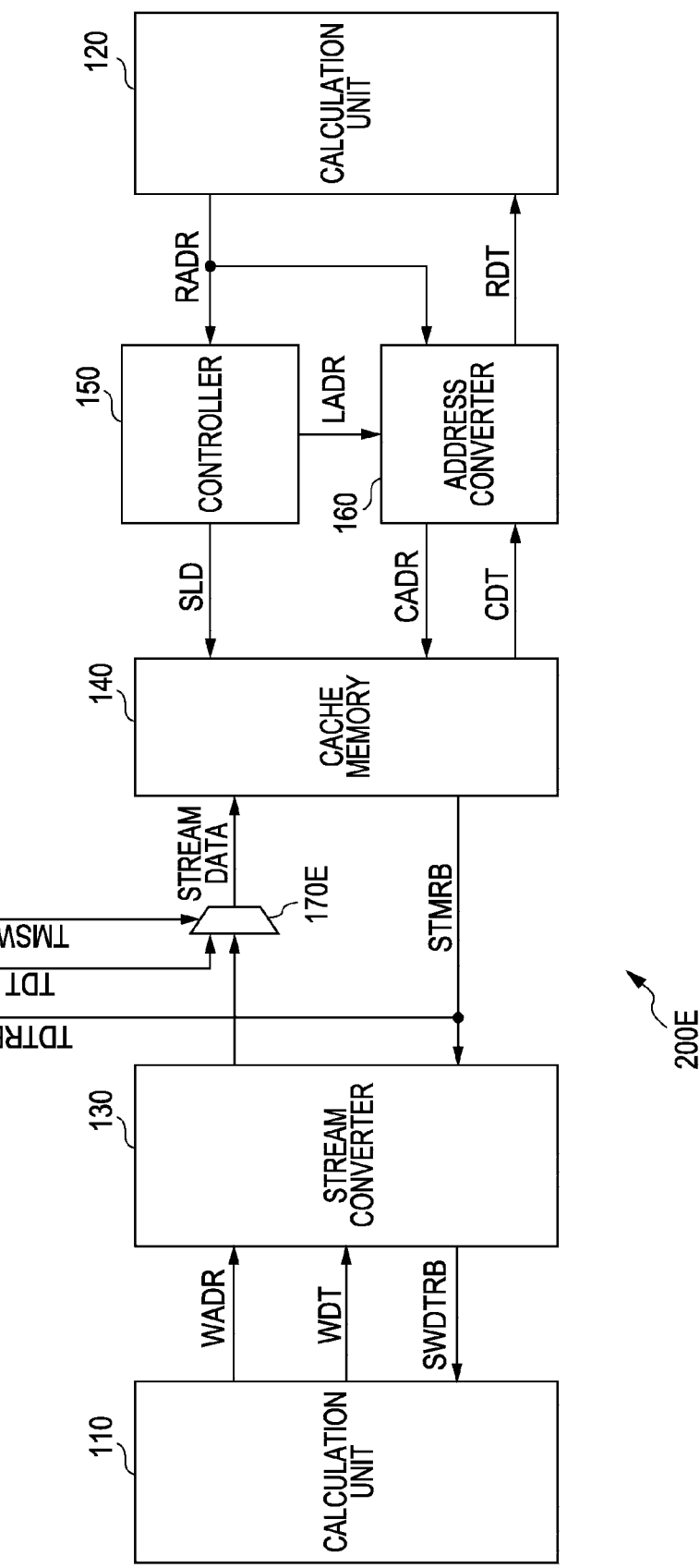
FIG. 9 is a block diagram illustrating an example of a configuration of a calculation processing apparatus employing an interface apparatus according to a sixth embodiment of the invention.

FIG. 9 is a block diagram illustrating an example of a configuration of a calculation processing apparatus employing an interface apparatus according to a sixth embodiment of the invention.

The interface apparatus 200E according to the sixth embodiment is different from the interface apparatus 200A according to the second embodiment in the following points.

The interface apparatus 200E includes a selector 170E which switches the data input from the first calculation unit 110 and test data TDT in response to a test mode switching signal TMSW so as to input the stream data STMD to the cache memory 140.

In addition, the interface apparatus 200E allows the cache memory 140 to supply the stream receivable signal STMRB as a test data receivable signal TDTRB to a test circuit (not shown).

The other configurations are the same as those of the second embodiment.

According to the sixth embodiment, the same effects as the aforementioned effects of the second embodiment may be obtained, and the test using the test data may be performed.

Example of Configuration of Interface Generation Apparatus

Now, a generation apparatus for the interface apparatus According to the embodiment of the invention is described.

Figure 10:
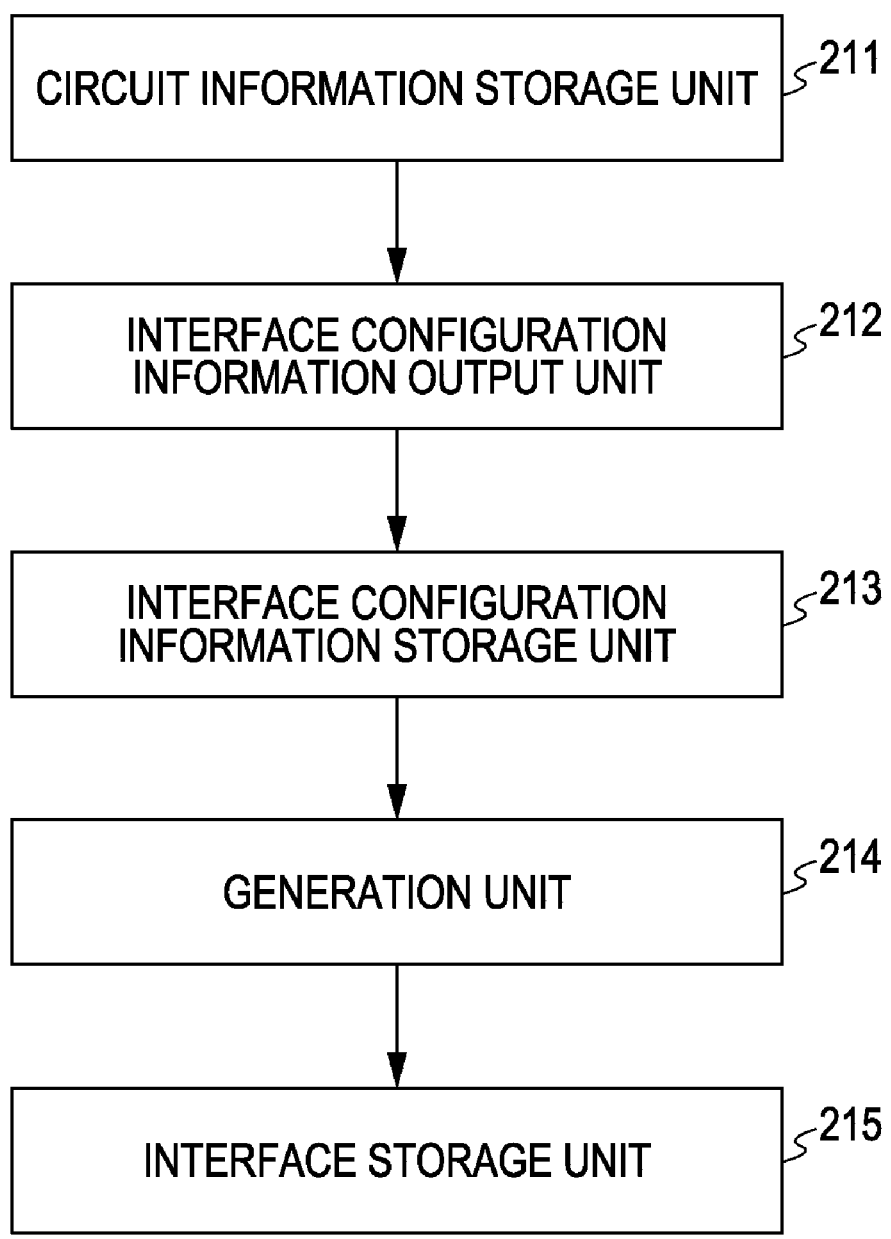
FIG. 10 is a block diagram illustrating an example of an interface generation apparatus according to the first to sixth embodiments.

FIG. 10 is a block diagram illustrating an example of an interface generation apparatus according to the first to sixth embodiments.

The interface generation apparatus 210 shown in FIG. 10 includes a circuit information storage unit 211, an interface configuration information output unit 212, an interface configuration information storage unit 213, a generation unit 214, and an interface storage unit 215.

The circuit information storage unit 211 stores information on a circuit connected to an interface that is an object of generation.

The interface configuration information output unit 212 analyzes, for example, specifications that are to be satisfied by the interface as shown in FIG. 11 from the circuit information and outputs the results of the analysis as interface configuration information to the interface configuration information storage unit 213.

The specifications that are to be satisfied by the interface shown in FIG. 11 are as follows.

1. Buffer Capacity of Stream Converter 130
2. Types of storage Devices Used for Buffer of Stream Converter 130
3. Capacity of Cache Memory 140
4. Types of storage Devices Used for Cache Memory 140
5. Number of Input of Read Address RADR
6. Pattern of Change in Pre-Load Address PLADR
7. Relationship between Read Addresses The interface configuration information storage unit 213 stores interface configuration information.

The generation unit 214 generates the interface apparatuses shown in FIGS. 4, 5, 6, 7, 8, and 9 based on the interface configuration information stored in the interface configuration information storage unit 213.

The interface storage unit 215 stores the interfaces generated by the generation unit 214.

In addition, detailed process of the interface generation apparatus 210 shown in FIG. 10 are described later.

7. Seventh Embodiment

Figure 12:
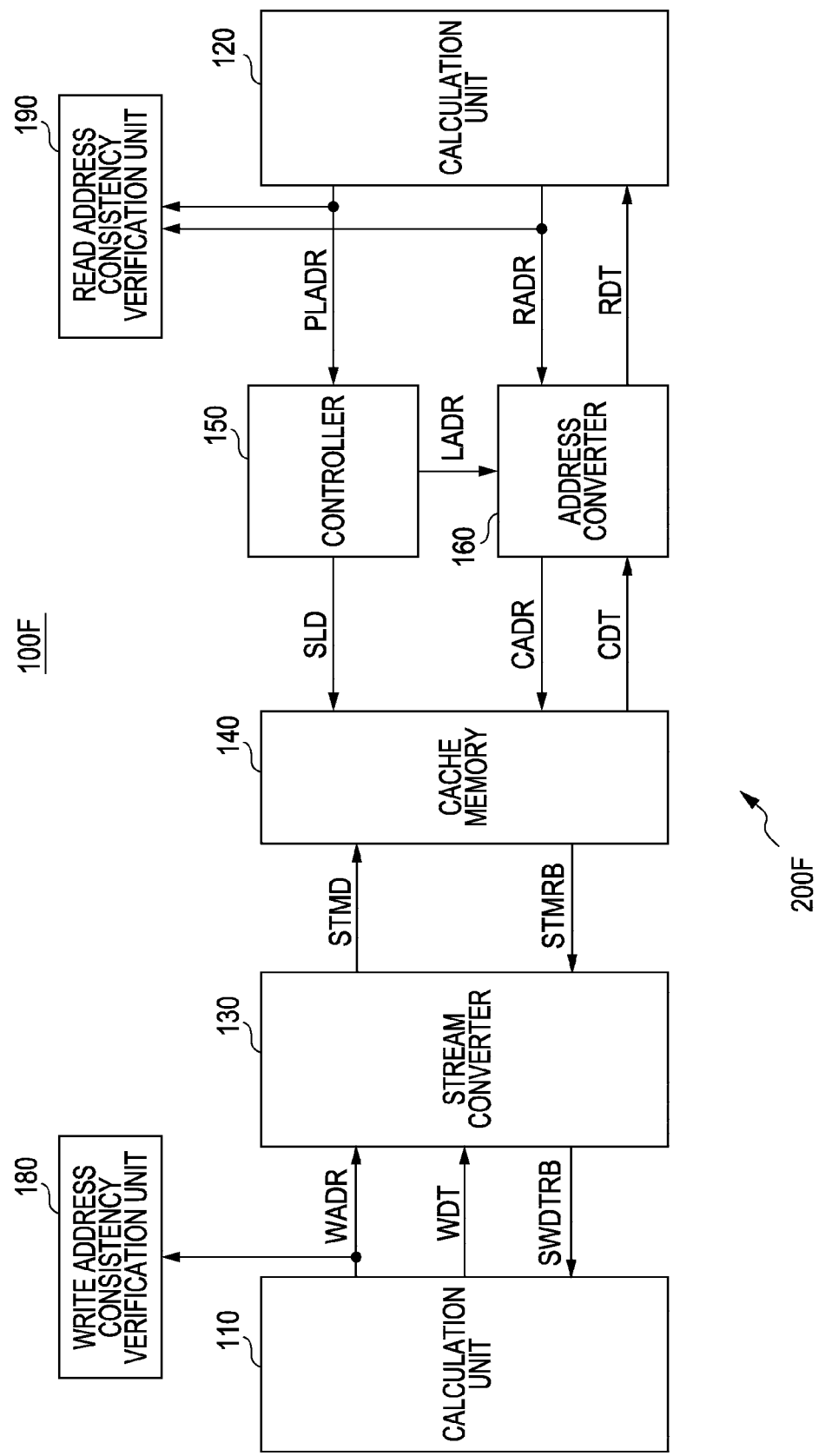
FIG. 12 is a block diagram illustrating an example of a configuration of a calculation processing apparatus employing an interface apparatus according to a seventh embodiment of the invention.

FIG. 12 is a block diagram illustrating an example of a configuration of a calculation processing apparatus employing an interface apparatus according to a seventh embodiment of the invention.

The interface apparatus 200F according to the seventh embodiment is different from the interface apparatus 200 according to the first embodiment in the following points.

The interface apparatus 200F is configured to include an address consistency verification unit in addition to the configuration of the interface apparatus 200.

The interface apparatus 200F includes a write address consistency verification unit 180 for verifying the consistency of the write address WADR and a read address consistency verification unit 190 for verifying the consistency of the pre-load address PLADR and the consistency of the read address RADR.

The write address consistency verification unit 180 calculates a capacity of storage devices that are necessary for an inner portion of the stream converter 130 from the output order of the write addresses WADR.

Next, the write address consistency verification unit 180 checks whether or not the calculated value of the capacity is larger than an actual value of the capacity of storage devices of the stream converter 130.

The read address consistency verification unit 190 calculates a capacity of storage devices that are necessary for the cache memory 140 from the output order of the pre-load address PLADR and the read address RADR.

Next, the read address consistency verification unit 190 checks whether or not the calculated value of the capacity is larger than an actual value of the capacity of storage devices of the cache memory 140.

The other configurations are the same as those of the first embodiment.

According to the seventh embodiment, the same effects as the aforementioned effects of the first embodiment may be obtained, and the consistency of the write address and the consistency of the read address may be accurately verified.

8. Eighth Embodiment

Figure 13:
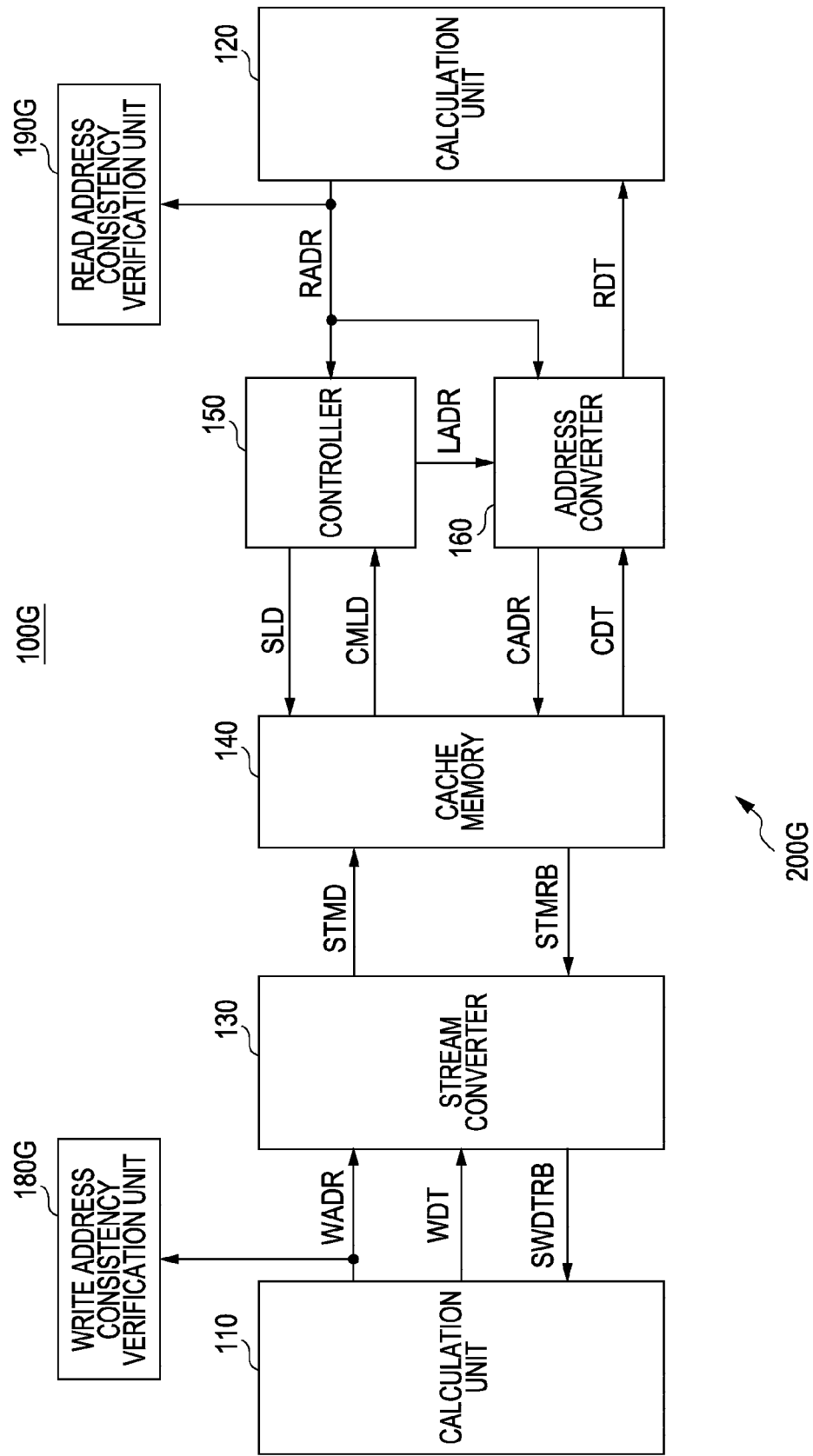
FIG. 13 is a block diagram illustrating an example of a configuration of a calculation processing apparatus employing an interface apparatus according to an eighth embodiment of the invention.

FIG. 13 is a block diagram illustrating an example of a configuration of a calculation processing apparatus employing an interface apparatus according to an eighth embodiment of the invention.

The interface apparatus 200G according to the eighth embodiment is different from the interface apparatus 200A according to the second embodiment in the following points.

The interface apparatus 200G is configured to include an address consistency verification unit in addition to the configuration of the interface apparatus 200A.

The interface apparatus 200G includes a write address consistency verification unit 180G for verifying the consistency of the write address WADR and a read address consistency verification unit 190G for verifying the consistency of the read address RADR.

The write address consistency verification unit 180G calculates a capacity of storage devices that are necessary for an inner portion of the stream converter 130 from the output order of the write addresses WADR.

Next, the write address consistency verification unit 180G checks whether or not the calculated value of the capacity is larger than an actual value of the capacity of storage devices of the stream converter 130.

The read address consistency verification unit 190G calculates a capacity of storage devices that are necessary for the cache memory 140 from the output order of the read address RADR.

Next, the read address consistency verification unit 190G checks whether or not the calculated value of the capacity is larger than an actual value of the capacity of storage devices of the cache memory 140.

The other configurations are the same as those of the second embodiment.

According to the eighth embodiment, the same effects as the aforementioned effects of the second embodiment may be obtained, and the consistency of the write address and the consistency of the read address may be accurately verified.

Figure 14:
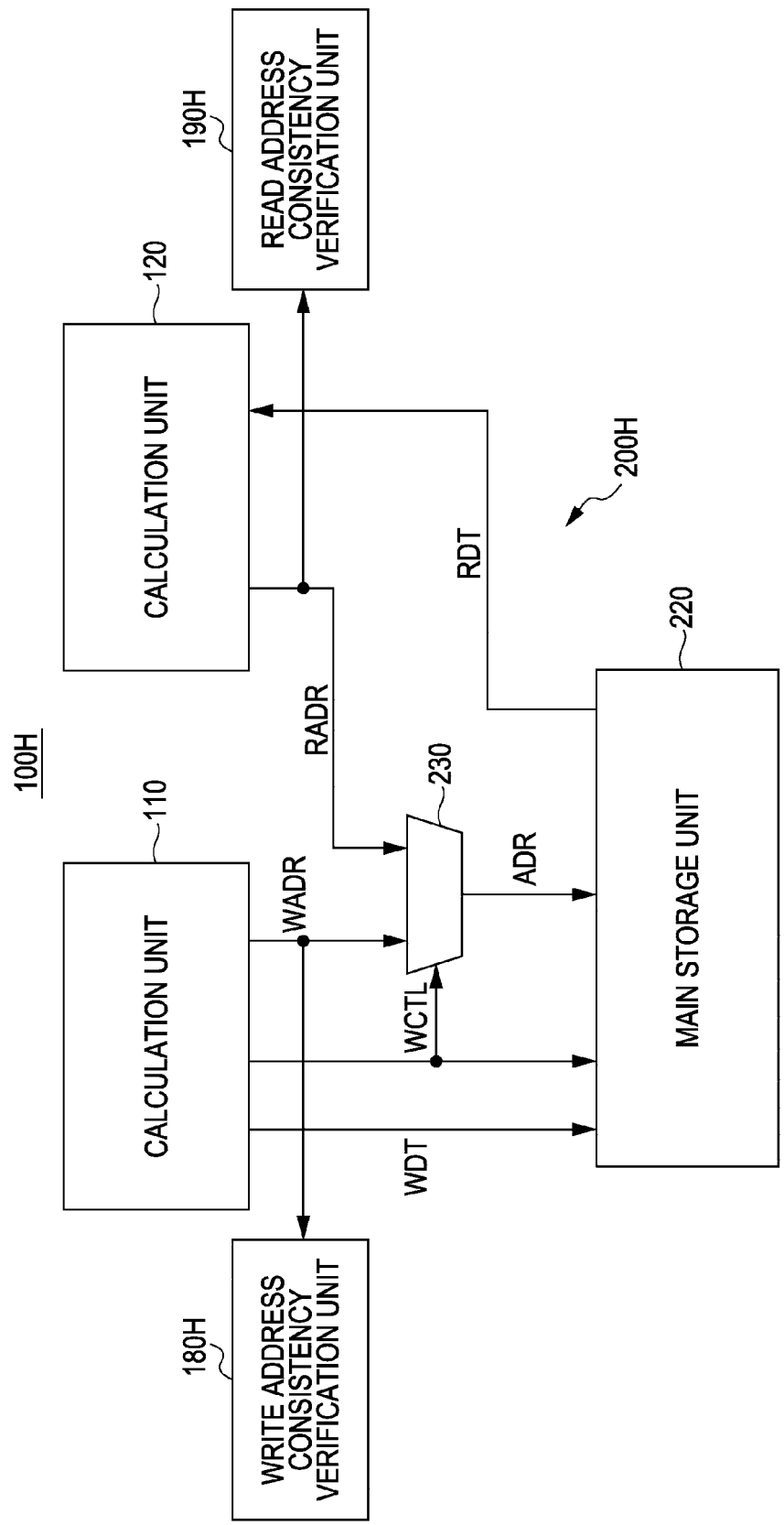
FIG. 14 is a block diagram illustrating an example of a configuration where an address consistency verification unit is provided to the calculation processing apparatus employing a general data transmission method.

FIG. 14 is a block diagram illustrating an example of a configuration where an address consistency verification unit is provided to the calculation processing apparatus employing a general data transmission method.

The calculation processing apparatus 100H shown in FIG. 14 includes a first calculation unit 110, a second calculation unit 120, a main storage unit 220, and an address selector 230.

The calculation processing apparatus 100H also includes a write address consistency verification unit 180H and a read address consistency verification unit 190H.

In addition, the main storage unit 220, the address selector 230, the write address consistency verification unit 180H, and the read address consistency verification unit 190H constitutes an interface apparatus 200H.

In addition, in FIG. 14, WDT, WADR, WCTL, RDT, RADR, and ADR denote write data, a write address, a write control signal, read data, a read address, and a selected address, respectively.

In the calculation processing apparatus 100H shown in FIG. 14, the write data WDT output from the first calculation unit 110 are stored at a position allocated with the write address WADR in the main storage unit 220.

Next, in the calculation processing apparatus 100H, the second calculation unit 120 reads data at a position allocated with the read address RADR from the storage device, so that the data transmission from the first calculation unit 110 to the second calculation unit 120 is performed.

The write address consistency verification unit 180H calculates a capacity of storage devices that are necessary for an inner portion of the main storage unit 220 from the output order of the write addresses WADR.

Next, the write address consistency verification unit 180H checks whether or not the calculated value of the capacity is larger than an actual value of the capacity of storage devices of the main storage unit 220.

The read address consistency verification unit 190H calculates a capacity of storage devices that are necessary for the main storage unit 220 from the output order of the read address RADR.

Next, the read address consistency verification unit 190H checks whether or not the calculated value of the capacity is larger than an actual value of the capacity of storage devices of the main storage unit 220.

Only the write address and the read address are important in the case of checking whether or not the write address WADR from the first calculation unit 110 or the read address RADR from the second calculation unit 120 is consistent with the interface apparatus.

Therefore, any interface apparatus having an address consistency verifying function, which has a configuration different from those of the interface apparatuses according to the first to eighth embodiments, may be employed.

Example of Configuration of Calculation Circuit Generation Apparatus for Calculation Circuit Connected to Interface Generation Apparatus Now, a circuit generation apparatus that generates a calculation circuit that is to be connected to an interface generation apparatus according to embodiments of the invention is described.

Figure 15:
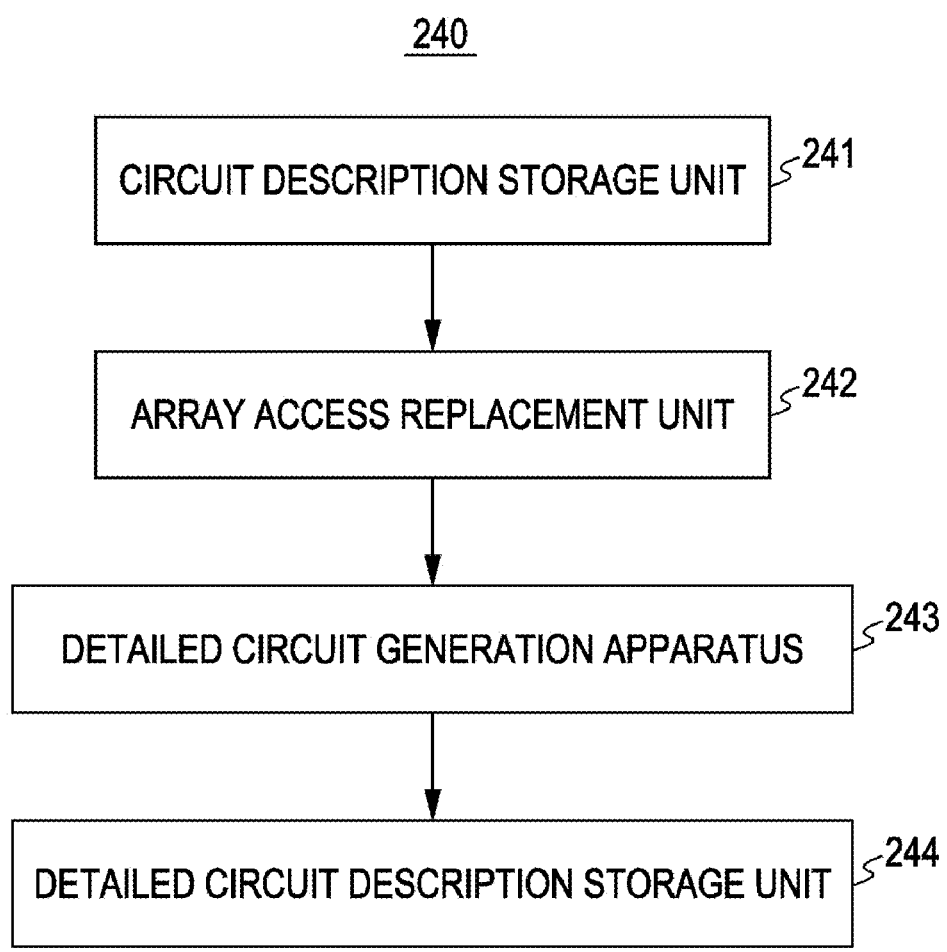
FIG. 15 is a block diagram illustrating a circuit generation apparatus that generates a calculation circuit that is to be connected to an interface generation apparatus according to embodiments of the invention.

FIG. 15 is a block diagram illustrating the circuit generation apparatus that generates a calculation circuit that is to be connected to an interface generation apparatus according to embodiments of the invention.

As shown in FIG. 15, the circuit generation apparatus 240 includes a circuit description storage unit 241, an array access replacement unit 242, a detailed circuit generation apparatus 243, and a detailed circuit description storage unit 244.

The circuit description storage unit 241 stores description representing functions of the calculation unit that is connected to the interface apparatus according to the embodiment of the invention.

The array access replacement unit 242 extracts reading and writing with respect to the array, which is to be an object of generation of the interface apparatus, from the circuit description read from the circuit description storage unit 241 and performs replacement with the description representing a communication protocol for connection to the interface apparatus.

The detailed circuit generation apparatus 243 generates, for example, detailed circuit description such as RTL or netlist by using a general high-level composition technique or a logic composition technique.

The detailed circuit description storage unit 244 stores the generated detailed circuit description.

Next, the configuration of the interface apparatus according to the embodiment is described in detail.

9. Ninth Embodiment

Figure 16:
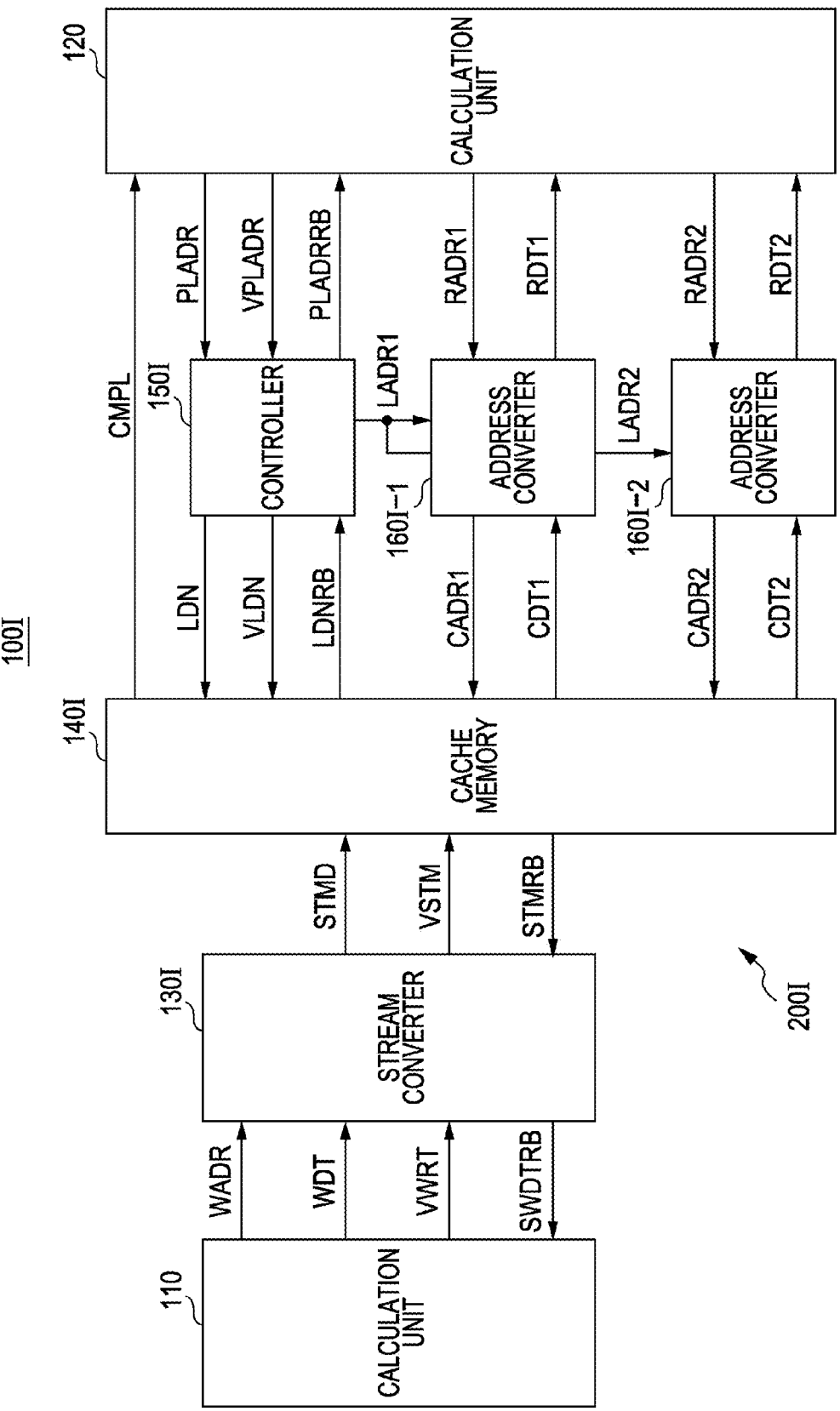
FIG. 16 is a block diagram illustrating an example of a configuration of a calculation processing apparatus employing an interface apparatus according to a ninth embodiment of the invention.

FIG. 16 is a block diagram illustrating an example of a configuration of a calculation processing apparatus employing an interface apparatus according to a ninth embodiment of the invention.

The interface apparatus 200I according to the ninth embodiment is different from the interface apparatus 200B according to the third embodiment in the following points.

In other words, the first calculation unit 110 outputs the write valid signal VWRT to the stream converter 130I.

The second calculation unit 120 outputs the pre-load address valid signal VPLADR to the controller 150I.

The stream converter 130I outputs the stream valid signal VSTM to the cache memory 140I.

The cache memory 140I outputs the loading number receivable signal LDNRB to the controller 150I and outputs the pre-load completed signal CMPL to the second calculation unit 120.

The controller 150I outputs the pre-load address receivable signal PLADRRB to the second calculation unit 120.

In addition, the controller 150I outputs the loading number LDN and the loading number valid signal VLDN to the cache memory 140I.

Similarly to the calculation processing apparatus 100B shown in FIG. 6, in the calculation processing apparatus 100I as well as the interface apparatus 200I, the second calculation unit 120 reads the write data WDT output from the first calculation unit 110 two by two.

In the case where the write data receivable signal SWDTRB output from the stream converter 130I is set to an active "1 (high level: H)", the first calculation unit 110 performs the following outputting.

The first calculation unit 110 outputs the write address WADR and the write data WDT, so that the write valid signal VWRT is set to the active "1(H)".

10. Examples of Detailed Configurations

Example of Configuration of Stream Converter

Figure 17:
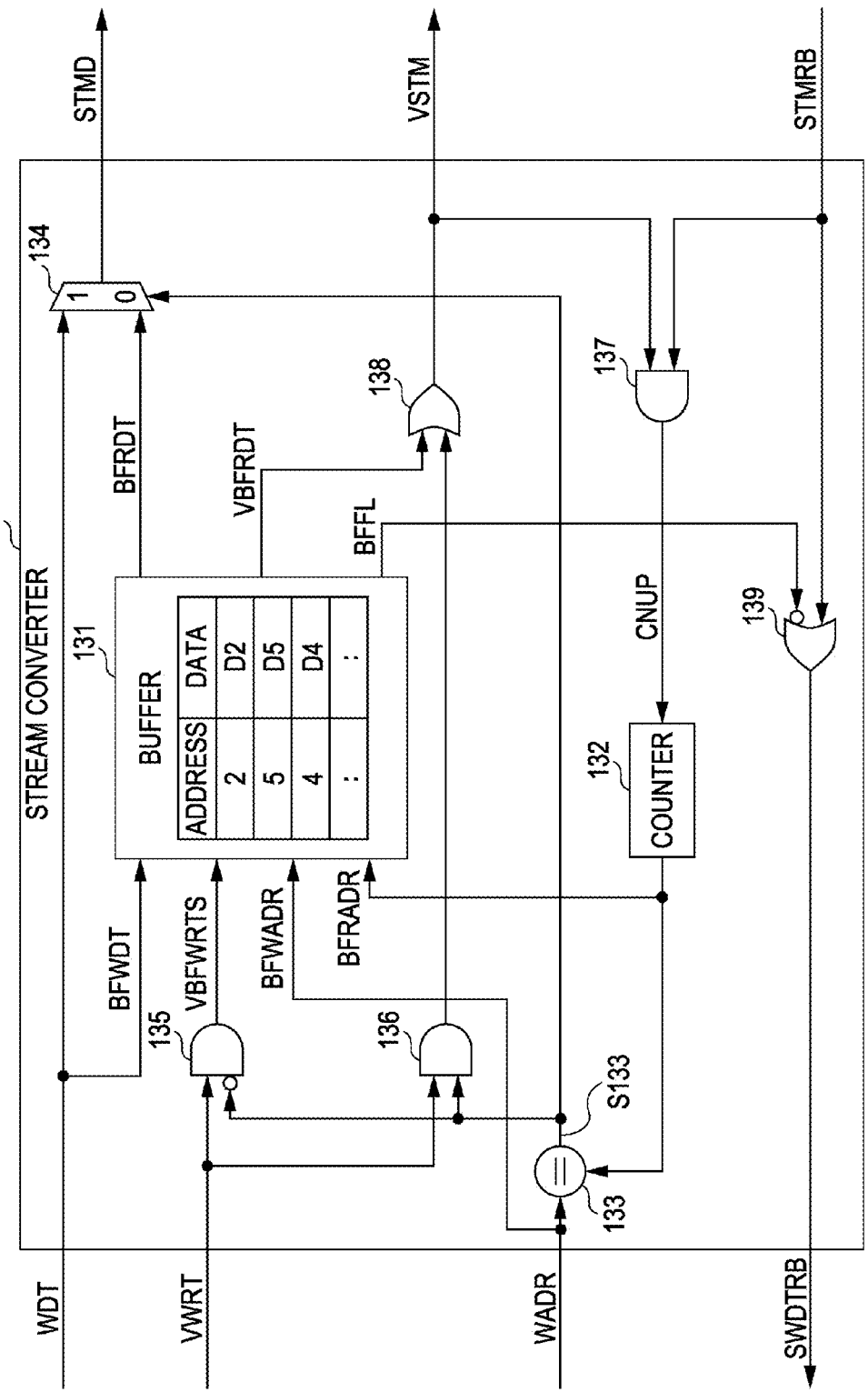
FIG. 17 is a diagram illustrating an example of a configuration of a stream converter according to embodiments of the invention.

FIG. 17 is a diagram illustrating an example of a configuration of a stream converter according to embodiments of the invention.

The stream converter 130I shown in FIG. 17 includes a buffer 131, a counter 132, a determination unit 133, a selector 134, two-input AND gates 135 to 137, and two-input OR gates 138 and 139.

The stream converter 130I also includes a buffer 131 for storing pairs of the write data WDT and the write address WADR therein.

In addition, the stream converter 130I maintains the address ADR of the write data that are to be output as next stream data by using the counter 132.

For example, when the count-up signal CNUP which is output from the AND gate 137 becomes "1(H)", the counter 132 counts up by 1.

When both of the stream valid signal VSTM and the stream receivable signal STMRB become "1", the stream converter 130I transmits the stream data STMD. The stream valid signal VSTM and the stream receivable signal STMRB are input to the AND gate 137. However, when both of the stream valid signal VSTM and the stream receivable signal STMRB becomes "1", the counter 132 counts up by 1.

The determination unit 133 determines whether or not the value of the counter 132 is equal to the write address WADR. A determination signal S133 as the determination result is output to a negative input terminal of the AND gate 135, an input terminal of the AND gate 136, and a control terminal of the selector 134.

If the value of the counter 132 is equal to the write address WADR, the determination unit 133 sets the signal S133 to "1(H)". If not equal, determination unit 133 sets the signal S133 to "0(L)".

If the determination signal S133 is "1", the selector 134 outputs the write data WDT as stream data STMD.

If the determination signal S133 is "0", the selector 134 outputs the buffer read data BFRDT read from the buffer 131 as stream data STMD.

In the case where the value of the counter 132 is equal to the value of the write address WADR so that the determination signal S133 is set to "1" and so that the write valid signal VWRT is set to "1", the output signal S136 of the AND gate 136 becomes "1".

Accordingly, the stream converter 130I sets the stream valid signal VSTM to "1" by using the OR gate 138 and outputs the write data WDT from the selector 134 as the stream data STMD.

In the case where the value of the counter 132 is not equal to the value of the write address WADR so that the determination signal S133 is set to "0" and so that the write valid signal VWRT is set to "1", the buffer write valid signal VBFWRT becomes "1", so that the write data WDT are stored in the buffer 131.

If the storable area of the buffer 131 is full, the buffer 131 sets the buffer full signal BFFL to "1".

In addition, the value of the counter 132 is also used as a read address BFRADR of the buffer 131.

The buffer 131 compares a list of stored addresses ADR with the read address BFRADR of the buffer 131, and if there is found a consistent address, the buffer 131 outputs the data, which are stored as a pair of the address, as buffer read data BFRDT.

Next, the buffer 131 sets the buffer read data valid signal VBFRDT to "1" and erases the output data from the buffer.

If the buffer full signal BFFL is "1" and if the stream receivable signal STMRB is "0", since the stream converter 130I does not receive the write data, the write data receivable signal SWDTRB is set to inactive "0".

Example of Configuration of Cache Memory

Figure 18:
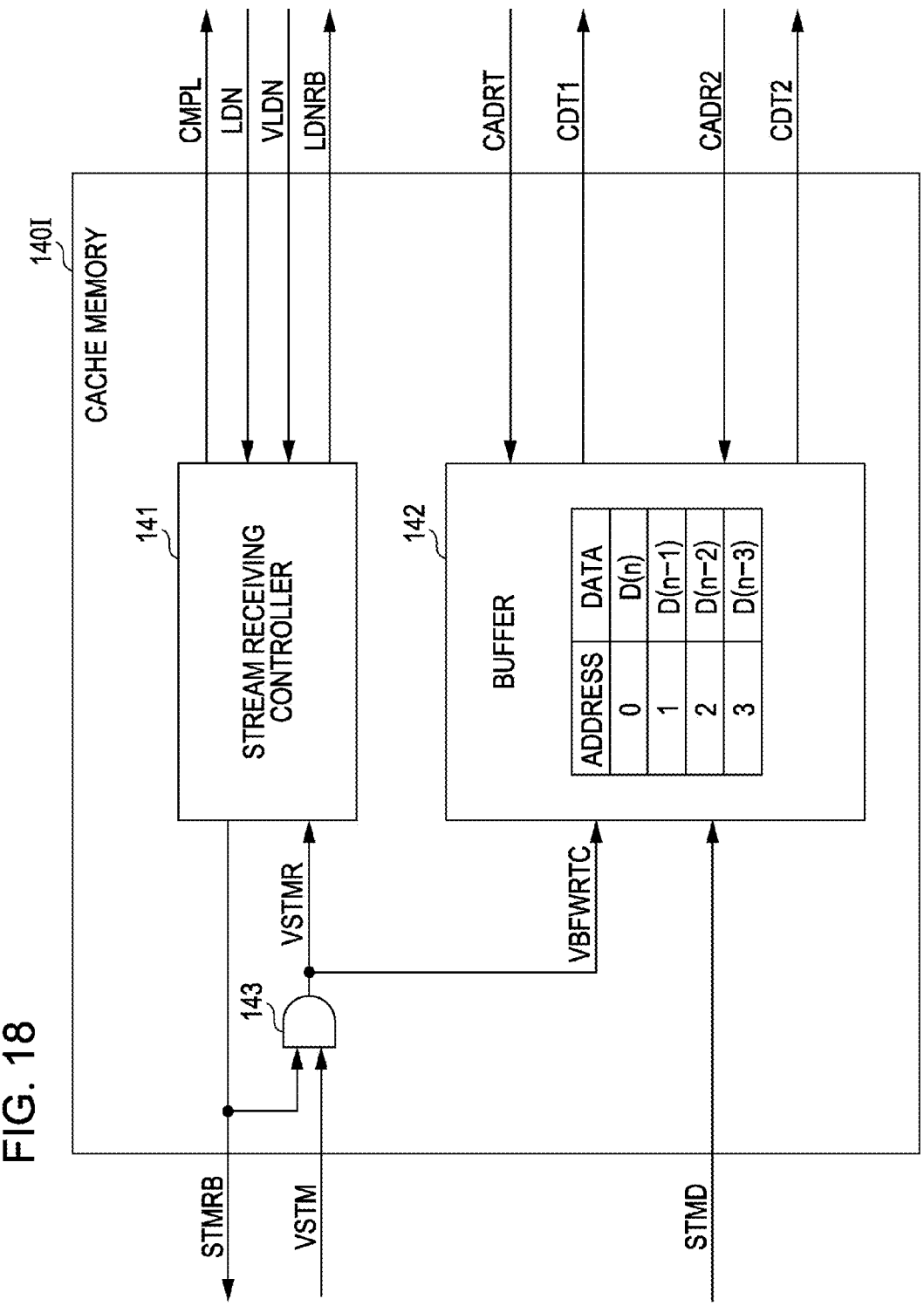
FIG. 18 is a diagram illustrating an example of a configuration of a cache memory according to embodiments of the invention.

FIG. 18 is a diagram illustrating an example of a configuration of a cache memory according to embodiments of the invention.

The cache memory 140I shown in FIG. 18 includes a stream receiving controller 141, a buffer 142, and a two-input AND gate 143.

When the loading number valid signal VLDN is "1(H)", the stream receiving controller 141 receives the loading number LDN.

The AND gate 143 performs a logic AND operation on the stream receivable signal STMRB and the stream valid signal VSTM and outputs the result thereof as the valid stream receiving signal VSTMR to the stream receiving controller 141.

The valid stream receiving signal VSTMR becomes "1" in the case where the stream receivable signal STMRB is set to "1" and the stream valid signal VSTM is set to "1".

Since the loading is performed once every time the valid stream receiving signal VSTMR becomes "1", the stream receiving controller 141 maintains the stream receivable signal STMRB to "1" until the valid stream receiving signal VSTMR becomes "1", that is, the number of times equal to the loading number LDN.

When receiving the loading number LDN, the stream receiving controller 141 sets the loading number receivable signal LDNRB and the pre-load completed signal CMPL to "0".

In addition, when the valid stream receiving signal VSTMR becomes "1", that is, the same number of times as the loading number LDN, the stream receiving controller 141 sets the loading number receivable signal LDNRB and the pre-load completed signal CMPL to "1".

The buffer 142 stores the last input stream data STMD in the address ADR0 and the stream data STMD, which are input in the one-preceding address ADR, every time the address ARD increases by one. Writing of the stream data STMD in the buffer 142 is performed when the buffer write valid signal VBFWRTC becomes "1".

For example, as shown in FIG. 18, the stream data input at the time point n are stored in the address ADR0, and the stream data input at the time point n−1 are stored in the address ADR1. In addition, the stream data input at the time point n−2 are stored in the address ADR2, and the stream data input at the time point n−3 are stored in the address ADR3.

In this state, if the buffer write valid signal VBFWRTC becomes "1", and if the stream data D(n+1) are input, the values are updated so that D(n+1), D(n), D(n−1), and D(n−2) are stored in the address ADR0, the address ADR1, the address ADR2, and the address ADR3.

In addition, the buffer 142 shown in FIG. 18 receives the cache addresses CADR1 and CADR 2 and outputs the data stored in the storage devices corresponding to the addresses as cache data CDT1 and CDT2.

Example of Configuration of Controller

Figure 19:
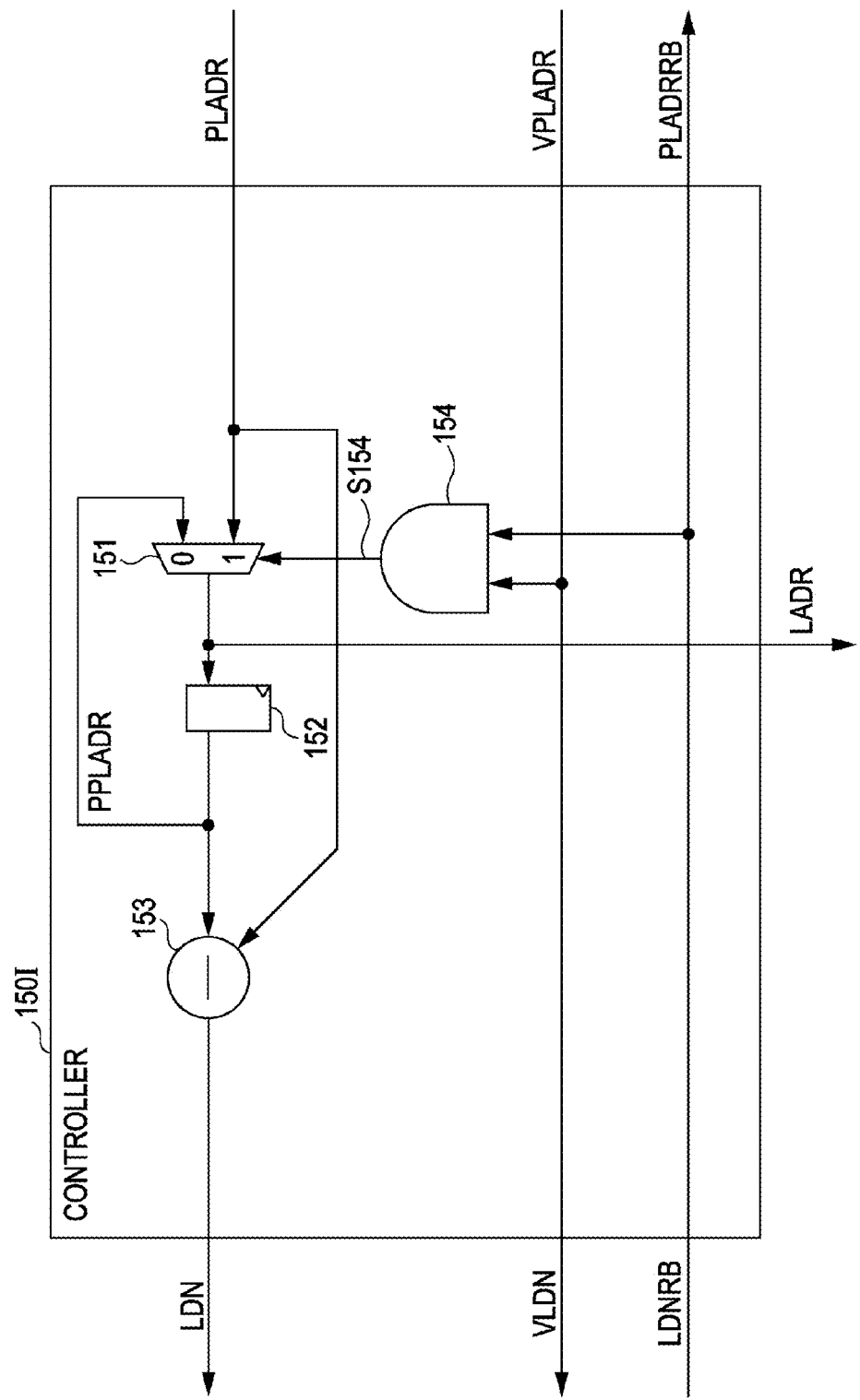
FIG. 19 is a diagram illustrating an example of a configuration of a controller according to embodiments of the invention.

FIG. 19 is a diagram illustrating an example of a configuration of a controller according to embodiments of the invention.

The controller 150I shown in FIG. 19 includes a selector 151, a latch 152 that is constructed with flip-flop, a subtractor 153, and a two-input AND gate 154.

As shown in FIG. 19, the controller 150I outputs the pre-load address valid signal VPLADR as a loading number valid signal VLDN.

In addition, the controller 150I outputs the loading number receivable signal LDNRB as a pre-load address receivable signal PLADRRB.

The selector 151 selects one of the pre-load address PLADR newly input in response to the output signal S154 of the AND gate 154 and the old pre-load address PPLADR latched in the latch 152 and outputs the selected address to the latch 152.

The subtractor 153 subtracts the old pre-load address PPLADR latched in the latch 152 from the newly input pre-load address PLADR.

In this manner, if the old pre-load address PPLADR is subtracted from the input pre-load address PLADR, the resulting value of subtraction becomes the number of data that are not loaded on the cache memory 140I.

The controller 150I outputs the value as the loading number LDN to the cache memory 140I.

In the case where both the pre-load address valid signal VPLADR and the pre-load address receivable signal PLADRRB are "1", the controller 150I updates the old pre-load address PPLADR and the load address LADR with the value of the newly input pre-load address PLADR.

Example of Configuration of Address Converter

Figure 20:
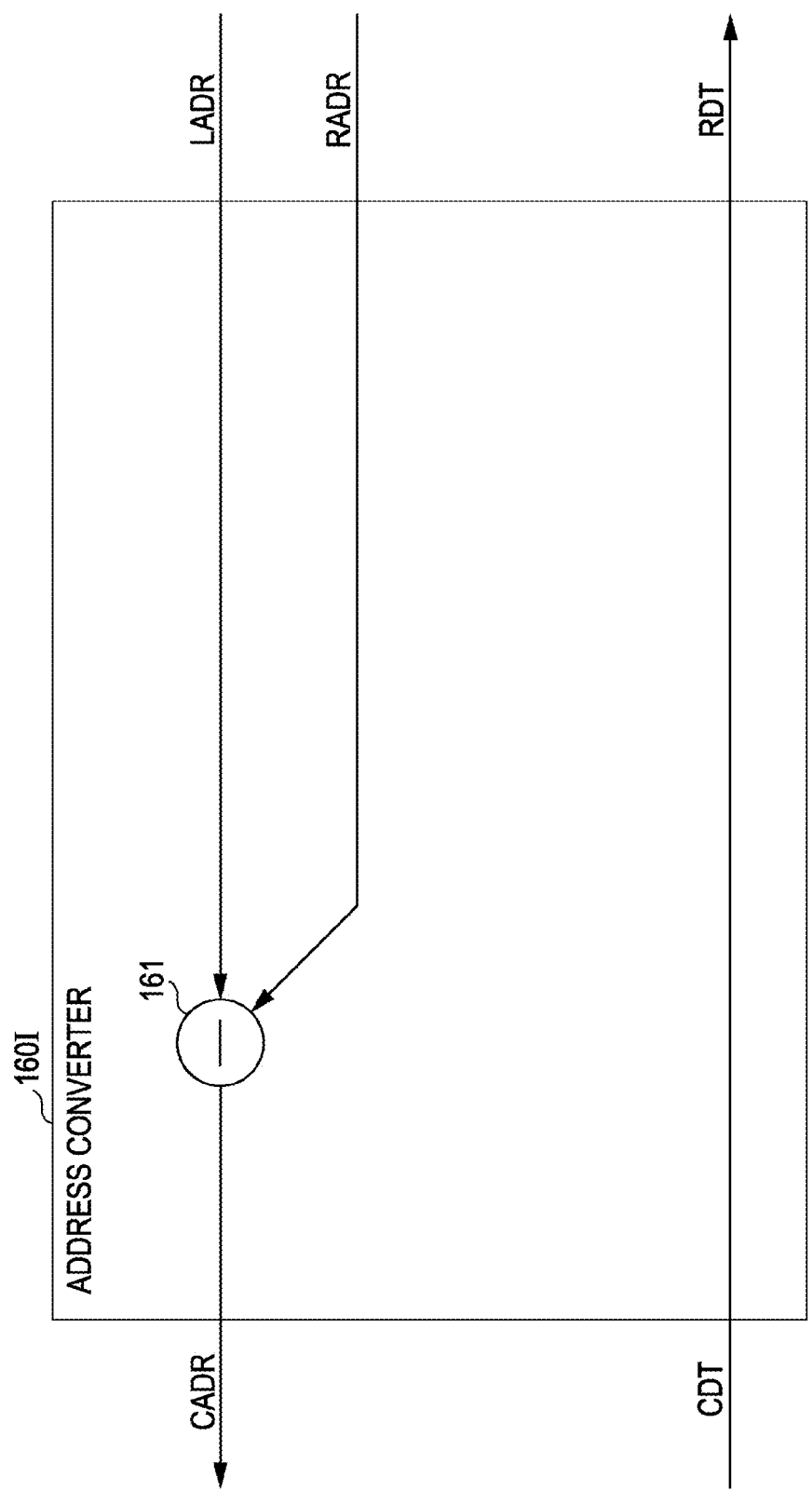
FIG. 20 is a diagram illustrating an example of a configuration of an address converter according to embodiments of the invention.

FIG. 20 is a diagram illustrating an example of a configuration of an address converter according to embodiments of the invention.

The address converter 160I shown in FIG. 20 includes a subtractor 161.

As shown in FIG. 20, the address converter 160I outputs the cache data CDT from the cache memory 140I as the read data RDT.

The cache memory 140I stores the data corresponding to the load address LADR in the address ADR0 and the data having the same value as that of the address ADR1 in the address that is lower by 1 than the load address LADR.

Therefore, when the subtractor 161 subtracts the read address RADR from the load address LADR, the result of the subtraction becomes the address of the cache memory 140I.

The address converter 160I outputs the cache address CADR obtained in the subtraction to the cache memory 140I.

In the calculation processing apparatus 100I shown in FIG. 16, before the second calculation unit 120 outputs the read address RADR1 and the read address RADR2, the second calculation unit 120 outputs the pre-load address PLADR that satisfies the following relationship shown in FIG. 21. In addition, in the following equations, CMC denotes a capacity of the cache memory 140I.

$$PLADR \geq RADR1$$

$$PLADR \geq RADR2$$

$$PLADR-RADR1+1 \leq CMC$$

$$PLADR-RADR2+1 \leq CMC \quad \text{[Equation 1]}$$

The second calculation unit 120 stands by until the pre-load completed signal CMPL becomes "1(H)", outputs the read address RADR1 and the read address RADR2, and receives the read data RDT1 and the read data RDT2.

The stream converter 130I shown in FIG. 17, the cache memory 140I shown in FIG. 18, the controller 150I shown in FIG. 19, and the address converter 160I shown in FIG. 20 may be implemented with more optimal configurations according to the specifications of the first calculation unit 110 and the second calculation unit 120.

For example, it may be assumed that the first calculation unit 110 has the specifications shown in FIG. 22 and the second calculation unit 120 has the specifications shown in FIG. 23.

As shown in FIG. 22, the write address WADR output from the first calculation unit 110 is increased by 1 from 0, that is, in this order of 0, 1, 2, 3, . . . , WIDTH−1.

The order of the write addresses WADR is the same as the order of the stream data that the stream converter 130I sorts and outputs.

Therefore, the function of sorting the write data is not necessary for the stream converter 130I.

Figure 24:
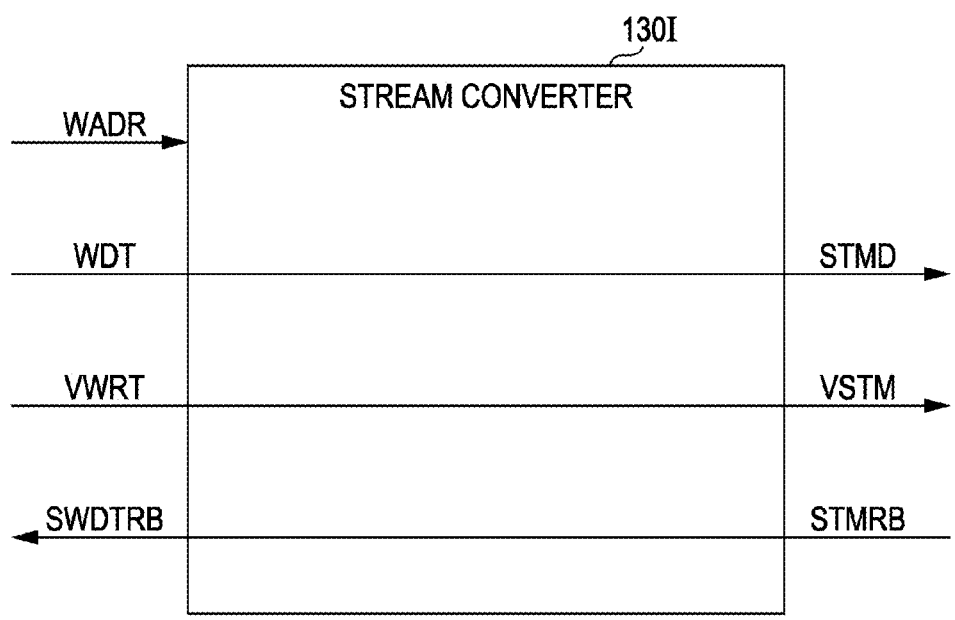
FIG. 24 is a diagram illustrating an example of a configuration of a stream converter in the case where the first calculation unit expressed by FIG. 22 is connected.

In the case where the stream converter 130I is connected to the first calculation unit 110 expressed by FIG. 22, as shown in FIG. 24, the stream converter 130I may be configured to output the write data WDT as the stream data STMD.

The pre-load address PLADR, the read address RADR1, and the read address RADR2 output from the second calculation unit 120 having the specifications shown in FIG. 23 are illustrated in FIG. 25.

Since two data, that is, the predicted address and the one-preceding address thereof, are used, cache memory 140I in the case of the second calculation unit 120 expressed in FIG. 23 may be provided with only two storage devices.

In the case where the cache memory 140I includes two storage devices, the cache address may be constructed with one bit.

As shown in FIG. 25, since the loading number LDN is typically 1 and the cache address CADR1 is typically 0, any calculation unit for calculating the loading number LDN and the cache address CADR1 is not necessary.

As shown in FIG. 25, since the cache address CADR1 is 0 or 1, a calculation unit for calculating the cache address CADR2 may have a 1-bit width.

Figure 26:
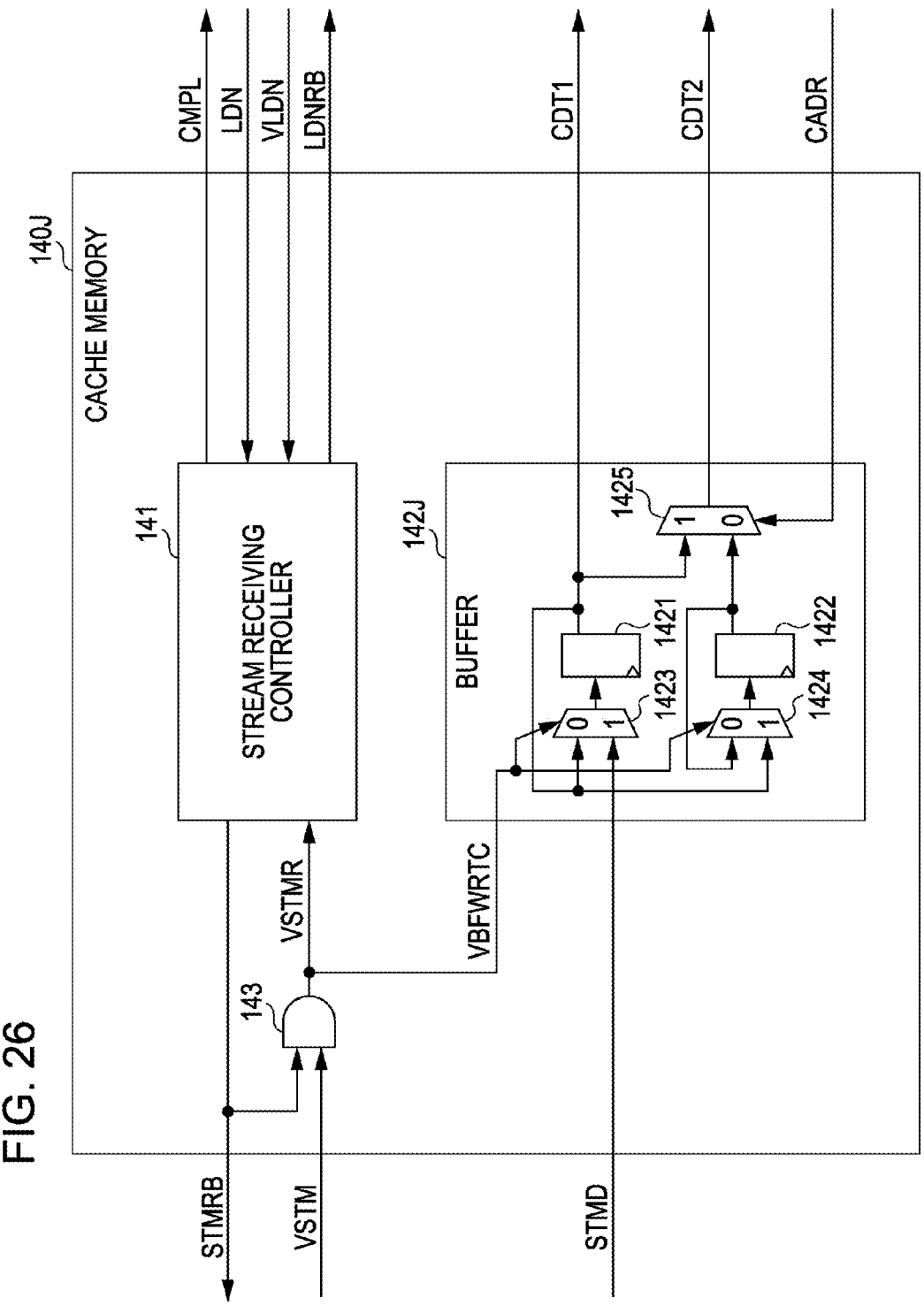
FIG. 26 is a diagram illustrating an example of a configuration of a cache memory which is to be connected to the second calculation unit having the specifications shown in FIG. 23.
Figure 27:
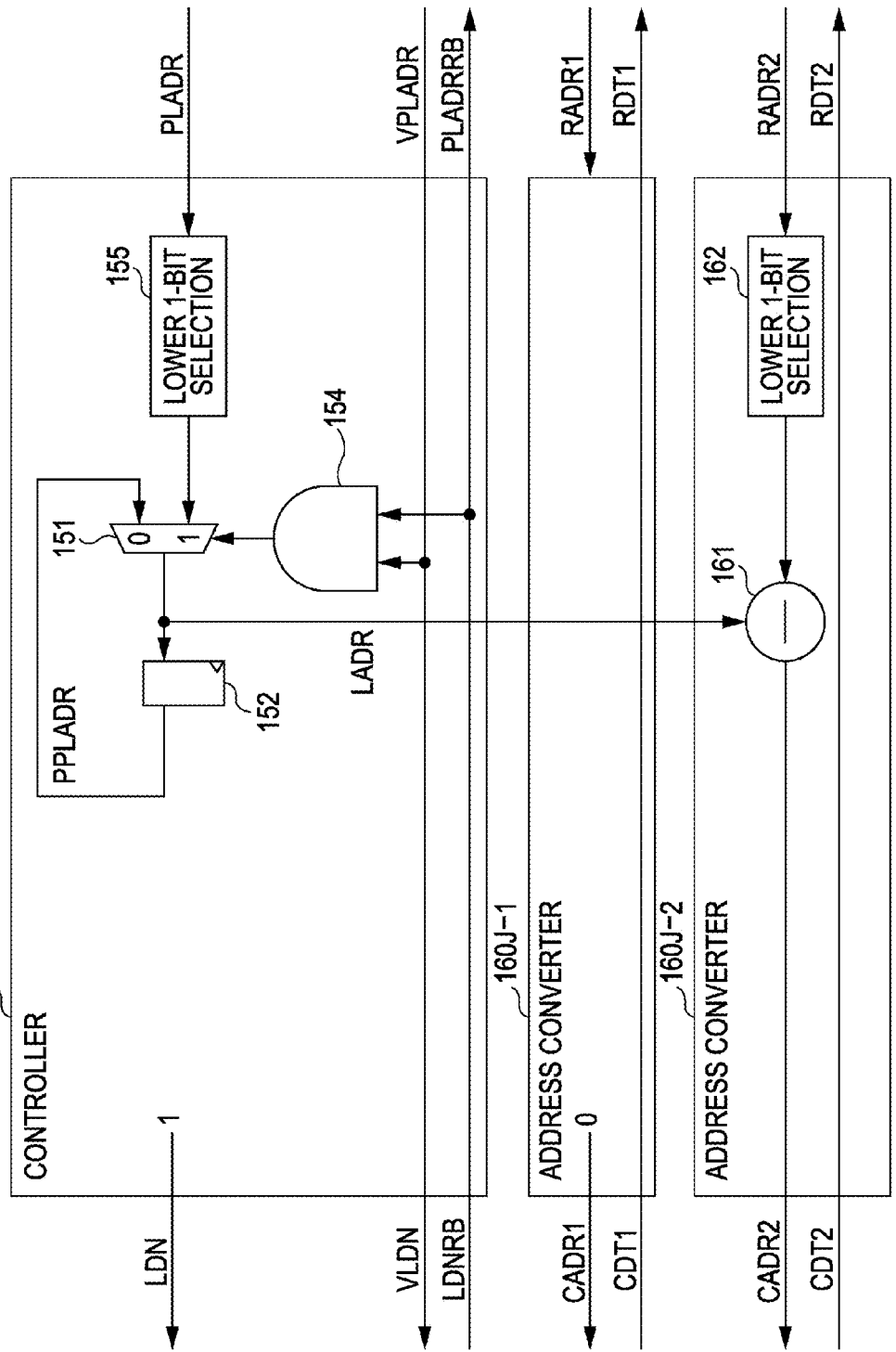
FIG. 27 is a diagram illustrating an example of a configuration of a controller and an address converter that correspond to only the connection to the second calculation unit shown in FIG. 23.

In summary, in the interface apparatus that is to be connected to the second calculation unit 120 having the specifications shown in FIG. 23, the cache memory 140J may be configured as shown in FIG. 26, and the controller 150J and the address converter 160J may be configured as shown in FIG. 27.

As shown in FIG. 26, the configuration of the cache memory 140J corresponding to the connection to the second calculation unit 120 expressed in FIG. 23 is optimized as the configuration where the internal buffer 142J includes only two storage devices 1421 and 1422 corresponding to the two data. The buffer 142J shown in FIG. 26 includes selectors 1423 to 1425 in addition to the storage devices 1421 and 1422. The storage devices 1421 and 1422 are constructed with, for example, flip-flops.

In addition, the configurations of the controller 150J and the address converter 160J corresponding to the connection to the second calculation unit 120 expressed in FIG. 23 are shown in FIG. 27.

In the example shown in FIG. 27, the controller 150J is not provided with a subtractor, and a lower bit selector 155 is disposed at the input stage for the pre-load address PLADR.

Similarly, a lower bit selector 162 is disposed at the input state for the read address RADR2 in the address converter 160J-2.

In the embodiment, the calculation using the pre-load address PLADR and the read address RADR is optimized so as to have a 1-bit width, and the configuration is optimized so that the loading number LDN is fixed to 1 and the cache address CADR1 is set to 0.

In this manner, by optimizing the configuration of the interface apparatus according to the specifications of the connected calculation unit, the interface apparatus having a small overhead may be implemented.

Now, the processes of the interface generation apparatus 210 shown in FIG. 10 are described in detail.

Herein, the operations of the interface configuration information output unit 212 shown in FIG. 10 are described with reference to FIGS. 28, 29, and 30.

Figure 28:
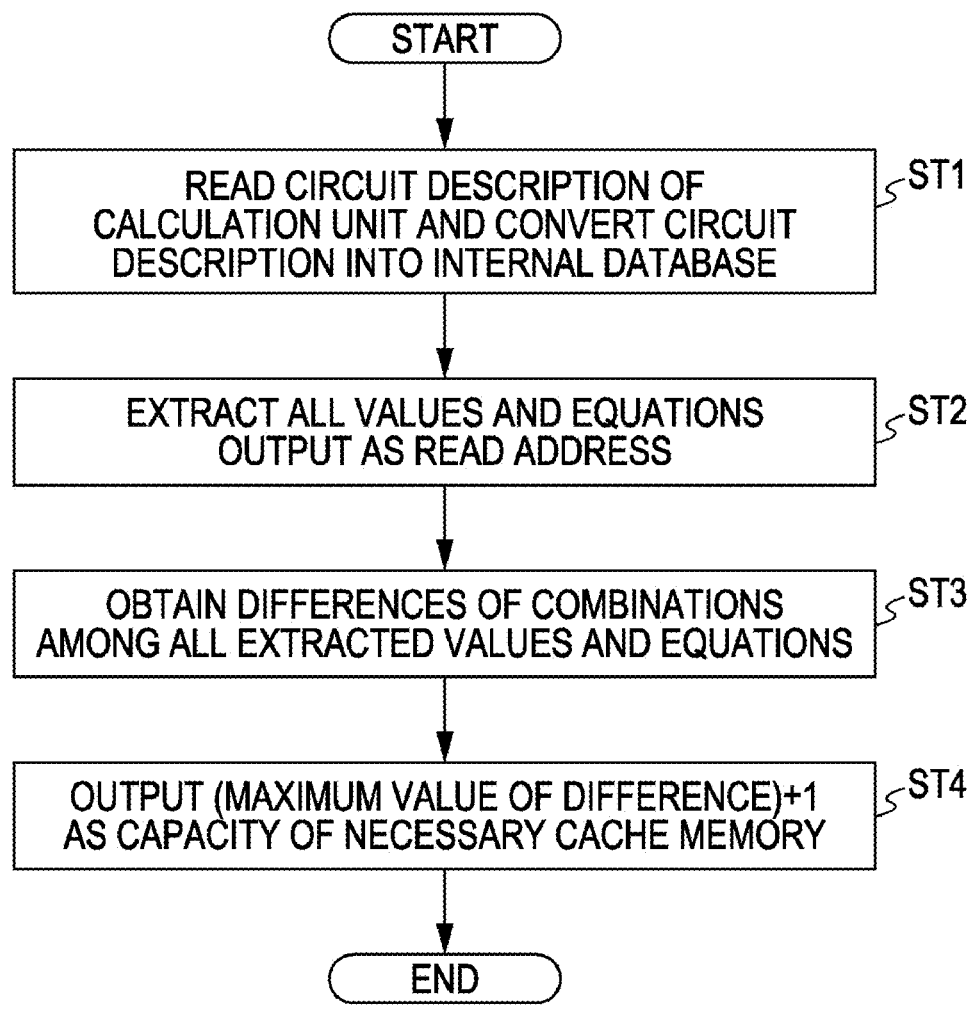
FIG. 28 is a diagram illustrating a flowchart of operations of an interface configuration information output unit in the interface generation apparatus shown in FIG. 10.

FIG. 28 is a diagram illustrating a flowchart of operations of the interface configuration information output unit 212 in the interface generation apparatus shown in FIG. 10.

Figure 29:
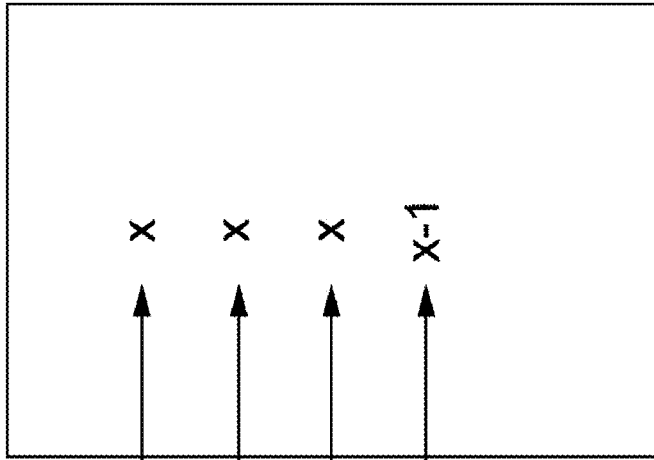
FIG. 29 is a diagram illustrating an example of circuit description of a calculation unit.

FIG. 29 is a diagram illustrating an example of circuit description of a calculation unit.

Figure 30:
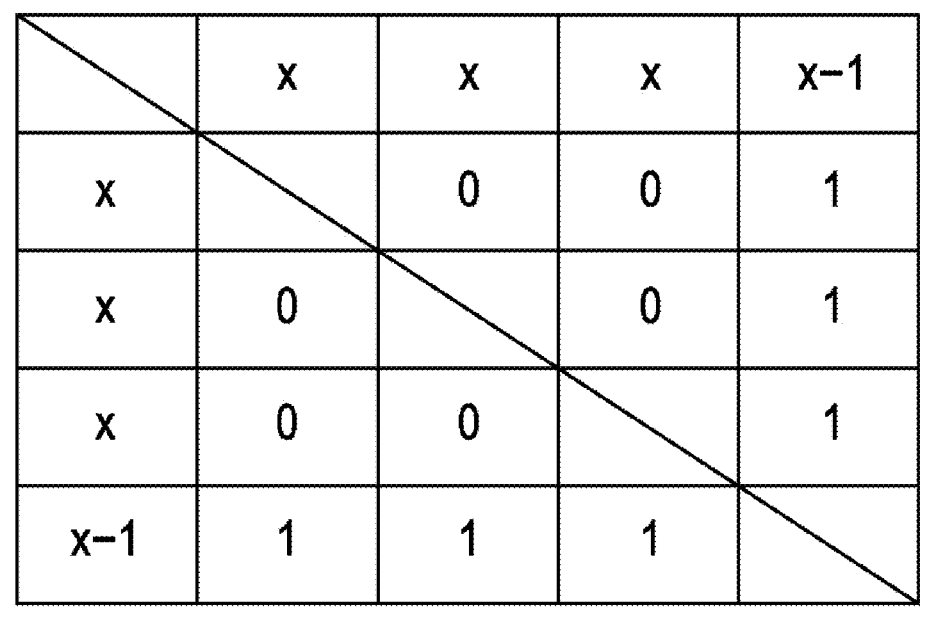

FIG. 30 is a diagram illustrating an example of difference in a calculation equation for addresses extracted from circuit description shown in FIG. 29.

First, interface configuration information output unit 212 reads the circuit description of the calculation unit from the circuit information storage unit 211 and converts the circuit description into internal database in the interface configuration information output unit 212 (ST1).

Next, the interface configuration information output unit 212 extracts all the values or equations output as the read address RADR (ST2).

For example, in the case where the circuit description of the calculation unit expressed in FIG. 29 is read, since there are four read addresses RADR which are output: x output from [pre_load_address]; x output from [read_address_a]; x and (x−1) output from [read_address_b], the three x's and one (x−1) are extracted.

Next, the interface configuration information output unit 212 calculates differences among all combinations in the extracted address calculation equation (ST3).

For example, in the case of the address calculation equation extracted from the circuit description shown in FIG. 29, the difference between x's is 0, and the difference between (x−1) and x is 1 as shown in FIG. 30. The value obtained by adding 1 to the maximum value among the calculated differences is set to a capacity of the storage devices that are necessary for the cache memory 140.

Finally, the value of 2 that is obtained by adding 1 to the maximum value, which is 1 among the calculated differences is output as a necessary capacity of the cache memory (ST4).

In this manner, the interface generation apparatus 210 shown in FIG. 10 generates the interface based on the interface configuration information output from the interface configuration information output unit 212.

In the example shown in FIG. 29, as the interface configuration information, (capacity of cache memory 140)=2 is output. Based on the information, the interface apparatus including the cache memory 140 having the storage device having a capacity CMC2 as shown in FIG. 26 is generated.

Next, an example of the verification interface apparatus according to an embodiment of the invention is described.

Figure 31:
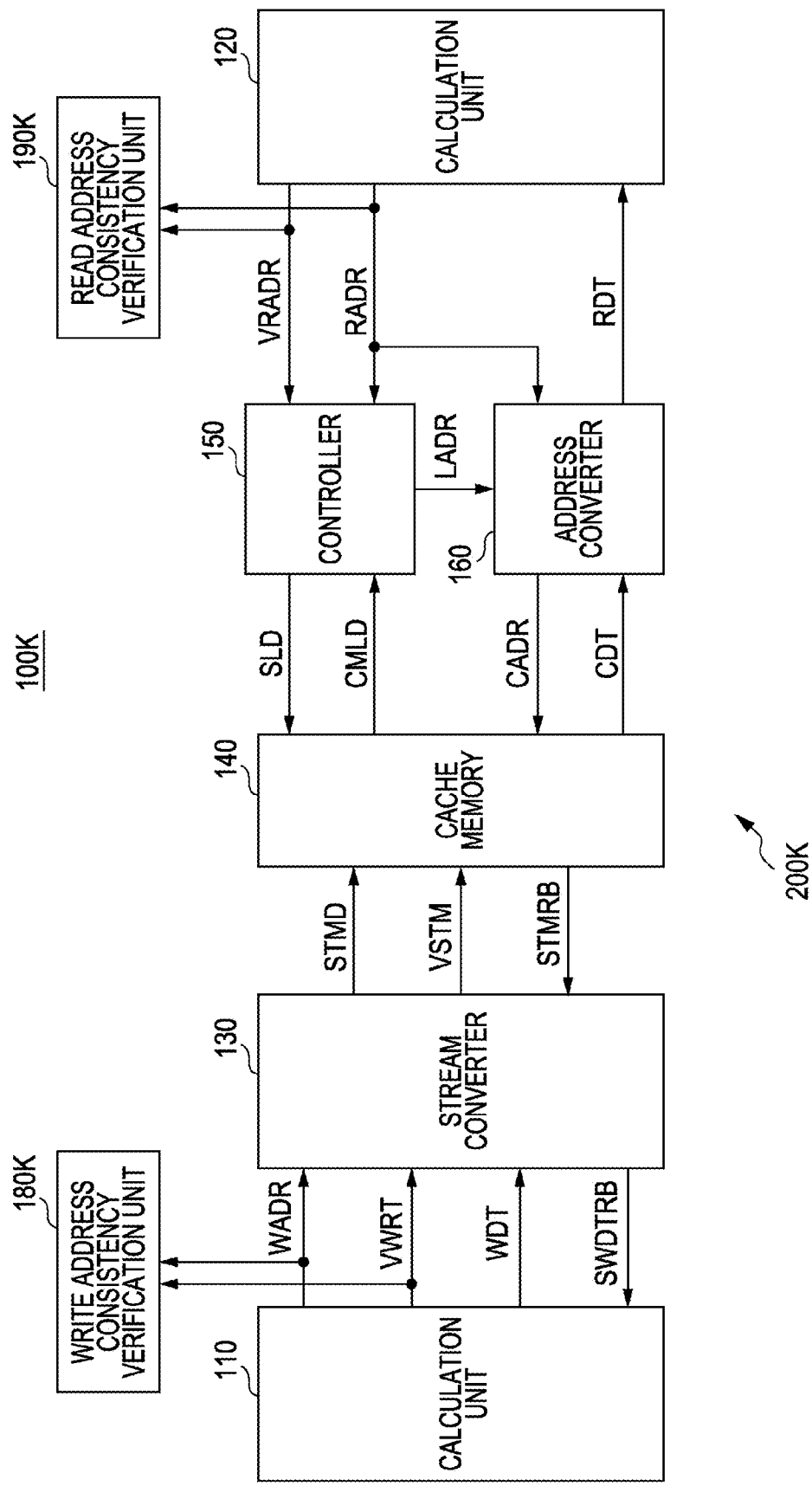
FIG. 31 is a diagram illustrating an example of a configuration of a calculation processing apparatus employing a verification interface apparatus according to embodiments of the invention.

FIG. 31 is a diagram illustrating an example of a configuration of a calculation processing apparatus employing the verification interface apparatus according to embodiments of the invention.

The verification interface apparatus 200K of the calculation processing apparatus 100K shown in FIG. 31 has the same configuration as that of the interface apparatus 200G of the calculation processing apparatus 100G shown in FIG. 13.

However, the interface apparatus 200K is different from the interface apparatus 200G in that the write valid signal VWRT, the stream valid signal VSTM, and the read address valid signal VRADR are used.

Herein, an example of operations of the write address consistency verification unit 180K of the verification interface apparatus shown in FIG. 31 is described.

Figure 32:
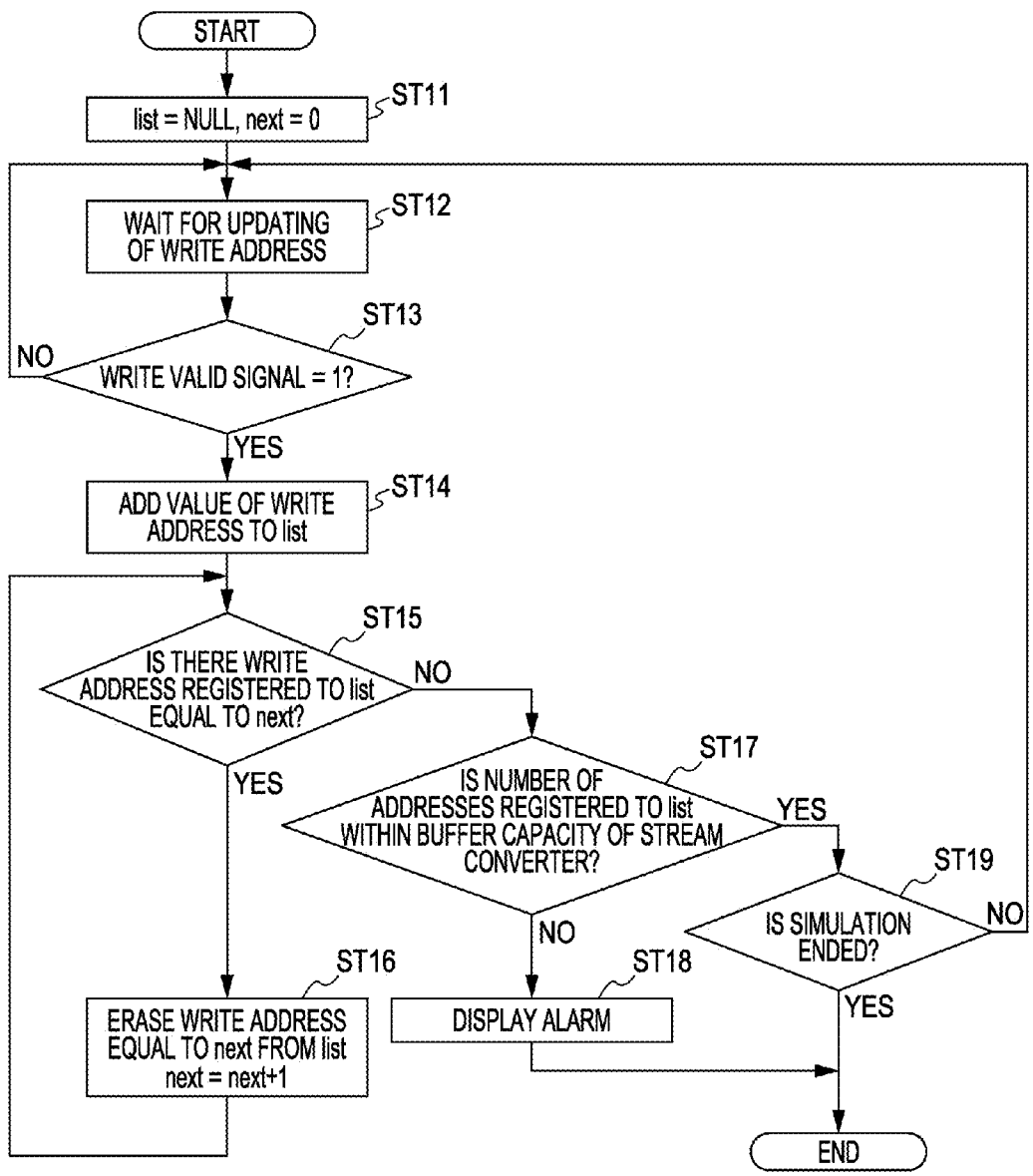
FIG. 32 is a diagram illustrating a flowchart of operations of a write address consistency verification unit in the verification interface apparatus shown in FIG. 31.

FIG. 32 is a diagram illustrating a flowchart of operations of the write address consistency verification unit 180K in the verification interface apparatus shown in FIG. 31.

First, "list" which stores information of the write address WADR is reset to null, and "next" which stores the write address WADR of the write data WDT that are to be output as the next stream data STMD is reset to 0 (ST11).

Next, the write address consistency verification unit 180K waits for updating of the write address WADR (ST12), and in the case where the write valid signal VWRT becomes "1" at the time of the updating, the write address consistency verification unit 180K adds the value of the write address to the "list" (ST13 and ST14).

The write address consistency verification unit 180K checks whether or not there is a write address WADR registered in the "list" that is equal to the "next" (ST15).

If there is an equal write address in Step ST15, the write address consistency verification unit 180K erases the equal write address from the "list" and perform "next"="next"+1 (ST16) and returns to the step of checking again whether or not there is a write address registered in the "list" that is equal to the "next".

If there is no equal write address in Step ST15, the write address consistency verification unit 180K checks the number of write addresses registered in the "list" is equal to or smaller than the buffer capacity of the stream converter included in the interface apparatus (ST17).

If the number exceeds the buffer capacity, the write addresses that the stream converter in the interface apparatus may not be able to cope with may be input, an alarm is displayed, and the process is ended (ST18).

If the number does not exceed the buffer capacity, it is checked whether or not the simulation is completed (ST19), and if the simulation is completed, the process is ended. If the simulation is not completed, the write address consistency verification unit 180K waits for the updating of the next write address.

FIG. 33 is a diagram illustrating a detailed table listing exemplary operations of the write address consistency verification unit in the verification interface apparatus shown in FIG. 32.

FIG. 33 illustrates the write addresses WADR and the write valid signals VWRT that are input at the time point t, the internal states of the write address consistency verification unit 180K, and the occurrence of the alarm display in the case where the buffer capacity of the stream converter 130 is 2.

At the time point t0, since the write valid signal VWRT is "0", no operation is performed.

At the time point t1, since the write valid signal VWRT is "1", the write address WADR0 is input to the "list".

Next, as a result of comparison, the addresses registered to the "next" and the "list" are equal to the address ADR0. Therefore, the address of 0 is erased from the "list", so that the "list" returns to null. In addition, since 1 is added to the "next", the value of the "next" becomes 1.

At the time point t2, the write address WADR4 is added to the "list". Since the address ADR of the "list" is not equal to that of the "next", the "list" becomes {4}, and the "next" becomes 1.

At the time point t3, the write address WADR2 is added to the "list". Since the address ADR of the "list" is not equal to that of the "next", the "list" becomes {4, 2}, and the "next" becomes 1.

At the time point t4, the write address WADR1 is added to the "list". Since the address {4, 2, 1} of the "list" is equal to the "next"=1, 1 is erased from the "list", the "list" becomes {4, 2}, and the "next" becomes 2.

Next, it is checked again whether the address of the "list" is equal to the "next" by comparing the address {4, 2} of the "list" with the "next"=2, and 2 is erased from the "list", so that the "list" becomes {4}, and the "next" becomes 3.

At the time point t5, the write address WADR5 is added to the "list", so that the "list" is set to {4, 5} and so that the "next" is set to 3.

At the time point t6, the write address WADR6 is added to the "list", so that the "list" is set to {4, 5, 6} and so that the "next" is set to 3. At this time, the number of addresses registered in the "list" becomes 3, and since the number exceeds the buffer capacity of 2 of the stream converter 130, the alarm is displayed and the operation is ended.

Next, an example of operations of the read address consistency verification unit 190K of the verification interface apparatus shown in FIG. 31 is described.

Figure 34:
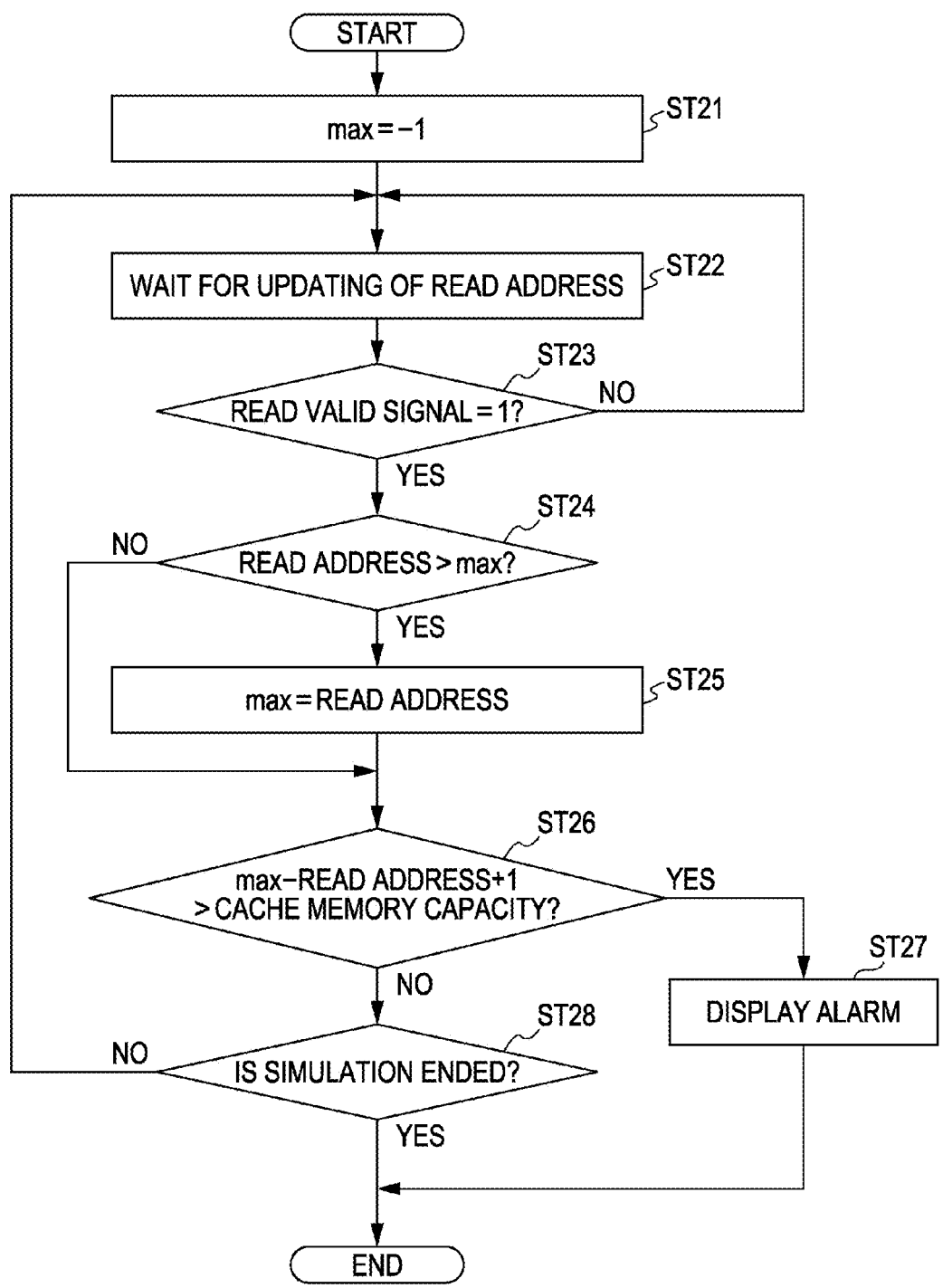
FIG. 34 is a diagram illustrating a flowchart of operations of a read address consistency verification unit in the verification interface apparatus shown in FIG. 31.

FIG. 34 is a diagram illustrating a flowchart of operations of the read address consistency verification unit 190K in the verification interface apparatus shown in FIG. 31.

First, the read address consistency verification unit 190K resets the "max" that stores the maximum value of the addresses, which are read up to the current time point, to −1 (ST21).

Next, read address consistency verification unit 190K waits for the updating the read address RADR (ST22).

Next, in the case where the read address valid signal VRADR becomes "1" at the time of the updating (ST23), the read address consistency verification unit 190K checks whether or not the read address is larger than the "max" (ST24). If the read address is larger than the "max", the read address consistency verification unit 190K replaces the value of the "max" with the value of the read address (ST25).

After the updating of the "max", the read address consistency verification unit 190K checks whether the (max-read address+1) indicating the necessary cache memory capacity is larger than a real cache memory capacity (ST26).

If the (max-read address+1) is larger than the cache memory capacity in Step ST26, an alarm is displayed, and the operation is ended (ST27).

If the (max-read address+1) is not larger than the cache memory capacity in Step ST26, the read address consistency verification unit 190K finally checks whether the simulation is completed (ST28). If the simulation is completed, the operation is ended. If the simulation is not completed, the read address consistency verification unit 190K waits for the updating of the next read address.

FIG. 35 is a diagram illustrating a detailed table listing exemplary operations of the read address consistency verification unit in the verification interface apparatus shown in FIG. 34.

FIG. 35 illustrates the read addresses RADR and the read address valid signals VRADR that are input at the time points t, the internal states of the read address consistency verification unit 190K, and the occurrence of the alarm display in the case where the capacity of the storage devices of the cache memory 140 is 2.

At the time point t0, since the read address valid signal VRADR is "0", any operation is not performed.

At the time point t1, since the read address valid signal VRADR is "1", by comparing the "max"=−1 with the read address of 1, the read address is larger than the "max", so that the read address of 1 is inserted into the "max".

Next, it is checked whether or not the (max-read address+1) exceeds the capacity of the cache memory 140, that is, 2. Since the (max-read address+1) is 1(=1-1+1), the (max-read address+1) does not exceed the capacity.

As the calculation proceeds in this manner, at the time pint 5, the (max-read address+1) becomes 3, which exceeds the cache memory capacity of 2. Therefore, at the time point t5, the alarm displayed, and the operation is ended.

Next, the processes performed by the circuit generation apparatus 240 shown in FIG. 15 are described in detail.

Herein, operations of the array access replacement unit 242 shown in FIG. 15 are described with reference to FIGS. 36, 37, and 38.

Figure 36:
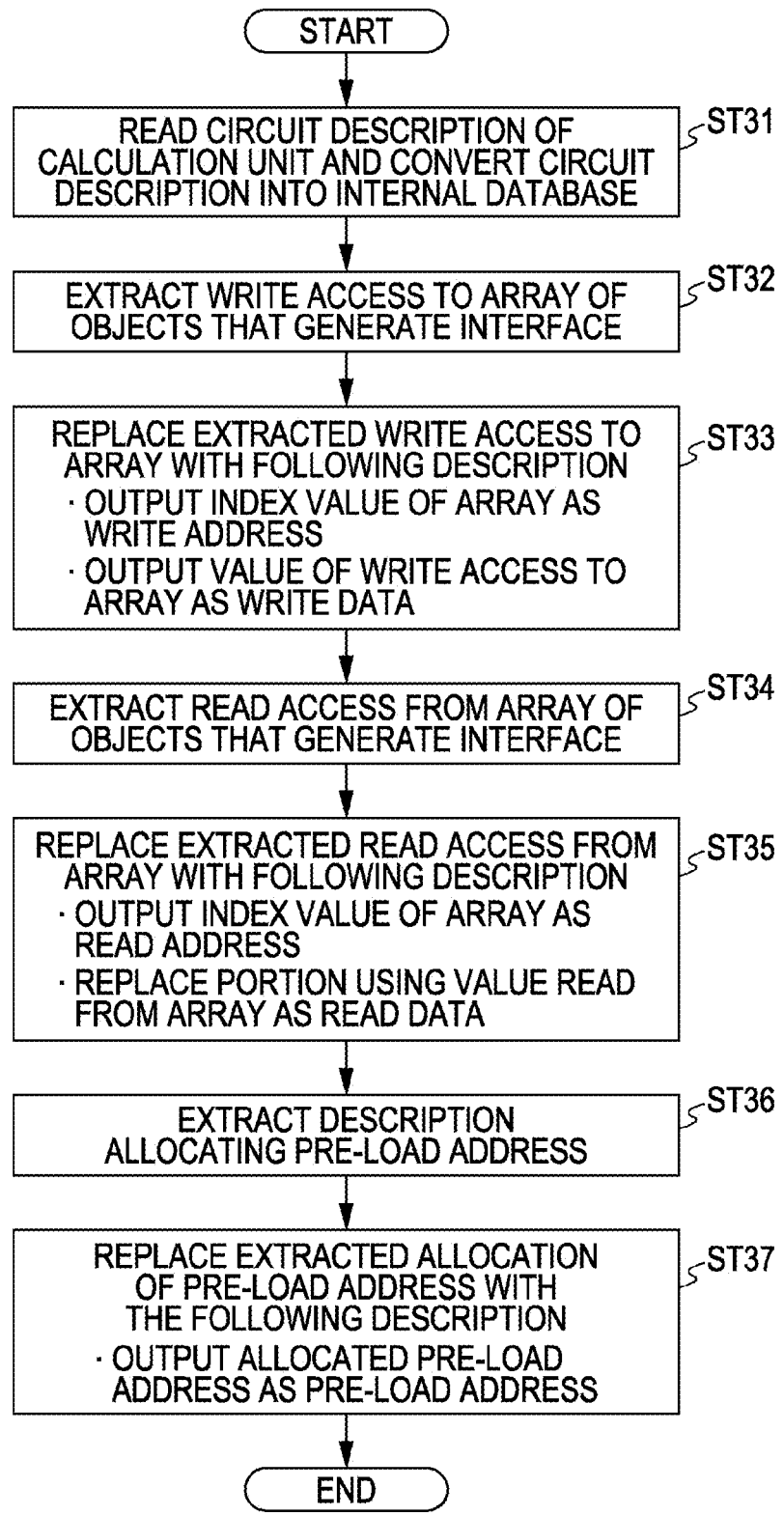
FIG. 36 is a diagram illustrating a flowchart of operations of an array access replacement unit in the circuit generation apparatus shown in FIG. 15.

FIG. 36 is a diagram illustrating a flowchart of the operations of the array access replacement unit 242 in the circuit generation apparatus shown in FIG. 15.

FIG. 37 is a diagram illustrating an example of circuit description stored in a circuit description storage unit.

FIG. 38 is a diagram illustrating an example where array access is replaced with description of performing connection to an interface apparatus.

First, the array access replacement unit 242 reads the circuit description of the calculation unit from the circuit description storage unit 241 and converts the circuit description into the internal database of the array access replacement unit 242 (ST31).

Next, the array access replacement unit 242 extracts the write access to the array that is the object of generation the interface (ST32), and replace a portion of performing the extracted write access to the array with the description for connection to the interface apparatus according to the embodiment (ST33).

At the time of the replacement, first, the extracted write access to the array is removed, and next, the description of outputting the write address WADR and the write data WDT to the interface apparatus is added to the position where the write access to the array is removed. The write address WADR is set to the value of index of the array, and the write data WDT are the data that are written in the array.

Next, the array access replacement unit 242 extracts the read access from the array that is the object of generation the interface (ST34), and replaces a portion of performing the extracted read access from the array with the description for connection to the interface apparatus according to the embodiment (ST35).

At the time of the replacement, first, the extracted read access from the array is removed, and next, the description of outputting the read address RADR and inputting the read data RDT with respect to the interface apparatus is added to the position where the read access from the array is removed.

The read address is set to the value of index of the array, and the value of the received read data is inserted into a variable where the value of reading the array is inserted.

Finally, the array access replacement unit 242 extracts the description of allocating the pre-load address (ST36), and replaces the description with the description for connection to the interface apparatus (ST37).

At the time of the replacement, first, the description of allocating the pre-load address is removed, and next, the description of outputting the pre-load address PLADR to the interface apparatus is added to the position where the description of allocating the pre-load address is removed. The pre-load address PLADR is set to the value of the description allocated to the pre-load address.

FIGS. 37 and 38 illustrate a detailed example of the operation of the array access replacement unit shown in FIG. 36.

The circuit description expressed in FIG. 37 is stored in the circuit description storage unit 241. The array is set to the array that is the object of generation of the interface, and the pre-load address is allocated with the comment "//pre_load_address=".

In this case, as shown in FIG. 38, the array access is replaced with the description where the connection to the interface apparatus is performed.

FIGS. 39 and 40 illustrate another example of the operation of the array access replacement unit shown in FIG. 36.

Unlike the example of FIGS. 37 and 38 where the array that is the object of generation of the interface is a one-dimensional array, the array in the example of FIGS. 39 and 40 is a two-dimensional array. In addition, the array that is the object of generation of the interface may be a three-or-more dimensional array.

In the circuit generation apparatus 240 shown in FIG. 15, the array access replacement unit 242 inputs the generated circuit description to the detailed circuit generation apparatus 243 so that the circuit description is converted into the more detailed circuit description.

The detailed circuit generation apparatus 243 use a general operation composition method.

The detailed circuit generation apparatus 243 determines detailed calculation timings of the circuit description expressed by the C language having a high level of abstraction, which is output from the array access replacement unit 242, and generates the circuit description that is more detailed than the circuit description expressed in a register transfer level or a netlist.

According to the embodiments described above, the following effects may be obtained.

The interface apparatus of connecting calculation units of accessing data by using address allocation may be implemented with storage devices having minimum capacity, so that area of circuits may be reduced.

Even in the case where the calculation unit may be easily designed by using the specifications for accessing data by using the address allocation, in the technology in the related art, the specifications for accessing data by using the address allocation may not be used as the specifications of the calculation unit in order to prevent an increase in the area of circuits. Therefore, there is a problem in that the design of the calculation unit is complicated.

However, by the interface apparatus According to the embodiments of the invention, the calculation units of accessing data by using the address allocation may be connected to each other with a practical area of circuits, the efficiency of design of the calculation unit may be improved.

Particularly, in general, in many cases of developing algorithms, the calculation unit of accessing data by using the address allocation may be designed.

By using the interface apparatus according to the embodiments of the invention, since the description generated in the development of algorithms may be directly used again for the design of circuits, the same design processes are prevented from being performed in the development of algorithms and the design of circuits, the number of design processes may be greatly reduced.

In addition, the invention are not limited to the aforementioned embodiments, but various changes and modifications may be made by those skilled in the art within the scope of the invention without departing from the spirit of the invention.

In addition, the aforementioned methods may be implemented by a program including the aforementioned procedures, which are executed by a CPU of a computer.

In addition, the program may be recorded on a recording medium such as a semiconductor memory, a magnetic disc, an optical disc, and a floppy (registered trade mark) disc, and a computer, in which the recording medium is set, may be configured to access and execute the program.

The present application contains subject matter related to that disclosed in Japanese Priority Patent Application JP 2009-019893 filed in the Japan Patent Office on Jan. 30, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An interface generation apparatus comprising:
    a stream converter to receive write addresses and write data, to store the received data in a buffer, and to sort the write data stored in the buffer in the order of the write addresses to output the write data as stream data;
    a cache memory to store received stream data in a storage device if a load signal is in a state of indicating that it is necessary that the stream data are loaded and to output data stored in the storage device corresponding to a cache address as cache data if the cache address is input;
    a controller to determine whether or not data allocated with address information on reading have already been loaded on the cache memory, to output the load signal instructing loading on the cache memory if the allocated data are not loaded on the cache memory as a result of the determination, and to output a load address indicating a load-completed address of the cache memory;
    at least one address converter to calculate a value representing which of storage devices of the cache memory the data allocated with the read address are stored in, by using the load address indicating the load-completed address of the cache memory, to output the calculated value as the cache address to the cache memory, and to output the cache data input from the cache memory as read data; and
    an interface generation configuration apparatus that determines a capacity of the cache memory by extracting values and equations output as address information on reading, calculates differences among combinations of extracted addresses and sets a value to the capacity by adding a predetermined value to a maximum value among the calculated differences.

2. The interface generation apparatus according to claim 1, wherein:
    the stream converter outputs the stream data only during a time that a stream receivable signal from the cache memory is in a receivable state, and
    the cache memory stores the stream data received from the stream converter in internal storage devices if the stream receivable signal is changed into the receivable state.

3. The interface generation apparatus according to claim 1 or 2, wherein:
    the stream converter outputs the write data receivable signal in the receivable state to a side of supplying the write data if the buffer is not full so that the write data is receivable, and
    a write data receivable signal is changed into a non-receivable state if the buffer is full so that the write data is not receivable.

4. The interface generation apparatus according to claim to 1, further comprising a selector to selectively input the stream data and test data to the cache memory.

5. The interface generation apparatus according to claim 1, further comprising a consistency verification unit to verify whether or not the data access is consistent with the interface apparatus.

6. The interface generation apparatus according to claim 5, wherein the consistency verification unit includes a write address consistency verification unit to verify consistency of the write address and a read address consistency verification unit to verify consistency of the address information on reading.

7. The interface apparatus according to claim 6, wherein the write address consistency verification unit calculates a capacity of the storage devices, which are necessary for an inner portion of the stream converter, from an output order of the write addresses and checks whether or not the calculated value of the capacity is larger than an actual value of the capacity of the storage devices of the stream converter.

8. The interface generation apparatus according to claim 6, wherein the read address consistency verification unit calculates a capacity of the storage devices, which are necessary for the cache memory, from an output order of the address information on the reading and checks whether or not the calculated value of the capacity is larger than an actual value of the capacity of the storage devices of the cache memory.

9. A calculation processing apparatus comprising:
a first calculation unit;
a second calculation unit; and
an interface generation apparatus that performs data transmission by using address allocation between the first calculation unit and the second calculation unit, wherein the interface generation apparatus includes:
 a stream converter to receive write addresses and write data from the first calculation unit, to store the received data in a buffer, and to sort the write data stored in the buffer in the order of the write addresses to output the write data as stream data;
 a cache memory to store received stream data in a storage device if a load signal is in a state of indicating that it is necessary that the stream data are loaded and to output data stored in the storage device corresponding to a cache address as cache data if the cache address is input;
 a controller to determine whether or not data allocated with address information on reading have already been loaded on the cache memory by the second calculation unit, to output the load signal instructing the loading on the cache memory if the allocated data are not loaded on the cache memory as a result of the determination, and to output a load address indicating a load-completed address of the cache memory; and
 at least one address converter to calculate a value representing which one of the storage devices of the cache memory the data allocated with the read address are stored in, by using the load address indicating the load-completed address of the cache memory, to output the calculated value as the cache address to the cache memory, and to output to the second calculation unit the cache data input from the cache memory as read data;
 wherein the interface generation apparatus that determines a capacity of the cache memory by extracting values and equations output as address information on reading, calculates differences among combinations of extracted addresses and sets a value to the capacity by adding a predetermined value to a maximum value among the calculated differences.

10. An interface generation apparatus for generating an interface apparatus, wherein the interface apparatus comprising:
a stream converter to receive write addresses and write data, to store the received data in a buffer, and to sort the write data stored in the buffer in the order of the write addresses to output the write data as stream data;
a cache memory to store received stream data in a storage device if a load signal is in a state of indicating that it is necessary that the stream data are loaded and to output data stored in the storage device corresponding to a cache address as cache data if the cache address is input;
a controller to determine whether or not data allocated with address information on reading have already been loaded on the cache memory, to output the load signal instructing the loading on the cache memory if the allocated data are not loaded on the cache memory as a result of the determination, and to output a load address indicating a load-completed address of the cache memory; and
at least one address converter to calculate a value representing which one of the storage devices of the cache memory the data allocated with the read address are stored in, by using the load address indicating the load-completed address of the cache memory, to output the calculated value as the cache address to the cache memory, and to output the cache data input from the cache memory as read data, wherein the interface generation apparatus comprises:
 a circuit information storage unit that stores circuit description information of a circuit connected to an interface that is an object of generation; and
 an interface configuration information output unit to analyze specifications, which are to be satisfied by the interface, based at least in part on the circuit description information read from the circuit information storage unit;
 wherein: the interface configuration information output unit reads the circuit description from the circuit information storage unit, converts the circuit description into internal database, extracts all values and equations output as the address information on reading, calculates differences among all combinations in the extracted address calculation equation, sets a value obtained by adding a predetermined value to a maximum value among the calculated differences to a necessary capacity of the cache memory; and
 the cache memory comprises storage devices corresponding to the capacity.

11. A circuit generation apparatus for generating a calculation unit connected to an interface apparatus, wherein the interface apparatus comprises:
a stream converter to receive write addresses and write data, to store the received data in a buffer, and to sort the write data stored in the buffer in the order of the write addresses to output the write data as stream data;
a cache memory to store received stream data in a storage device if a load signal is in a state of indicating that it is necessary that the stream data are loaded and to output data stored in the storage device corresponding to a cache address as cache data if the cache address is input;
a controller to determine whether or not data allocated with address information on reading have already been loaded on the cache memory, to output the load signal instructing the loading on the cache memory if the allocated data are not loaded on the cache memory as a result of the determination, and to output a load address indicating a load-completed address of the cache memory; and at least one address converter to calculate a value representing which one of the storage devices of the cache memory the data allocated with the read address are stored in, by using the load address indicating the load-completed address of the cache memory, to output the calculated value as the cache address to the cache memory, and to output the cache data input from the cache memory as read data, wherein the circuit generation apparatus comprises:

a circuit description storage unit to store description expressing functions of the calculation unit connected to the interface apparatus;

an array access replacement unit to extract reading and writing with respect to an array, which is to be an object of generation of the interface apparatus, from the circuit description read from the circuit description storage unit and to perform replacement with description expressing a communication protocol for connection to the interface apparatus;

a detailed circuit generation apparatus to generate detailed circuit description from description that is subject to replacement of array access; and an interface generation apparatus that determines a capacity of the cache memory by extracting values and equations output as address information on reading, calculates differences among combinations of extracted addresses and sets a value to the capacity by adding a predetermined value to a maximum value among the calculated differences.

* * * * *